United States Patent
Sammak et al.

(10) Patent No.: US 7,920,736 B2
(45) Date of Patent: *Apr. 5, 2011

(54) METHODS AND SYSTEMS FOR IMAGING CELLS

(75) Inventors: Paul J. Sammak, Pittsburgh, PA (US); Rami Mangoubi, Newton, MA (US); Mukund Desai, Needham, MA (US); Christopher Jeffreys, North Las Vegas, NV (US)

(73) Assignees: The Charles Stark Draper Laboratory, Inc., Cambridge, MA (US); University of Pittsburgh-of the Commonwealth System of Higher Education, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,547

(22) Filed: Apr. 19, 2010

(65) Prior Publication Data

US 2010/0260406 A1 Oct. 14, 2010

Related U.S. Application Data

(63) Continuation of application No. 11/128,612, filed on May 13, 2005, now Pat. No. 7,711,174.

(60) Provisional application No. 60/570,650, filed on May 13, 2004.

(51) Int. Cl.
*G06K 9/00* (2006.01)
*A01N 63/00* (2006.01)

(52) U.S. Cl. ........................ 382/133; 382/224; 424/93.2

(58) Field of Classification Search .................. 382/100, 382/106, 107, 128, 129, 130, 131, 132, 133, 382/168, 181, 191, 203, 232, 255, 260, 274, 382/276, 291, 317–321, 224; 703/2; 250/208.1; 600/544; 119/421; 424/278.1, 93.2; 702/19
See application file for complete search history.

(56) References Cited

U.S. PATENT DOCUMENTS

| | | | |
|---|---|---|---|
| 4,150,360 A * | 4/1979 | Kopp et al. | 382/133 |
| 4,905,296 A | 2/1990 | Nishihara | |
| 5,526,258 A | 6/1996 | Bacus | |
| 5,919,464 A * | 7/1999 | Mann et al. | 424/278.1 |
| 5,989,835 A | 11/1999 | Dunlay et al. | |
| 6,103,479 A | 8/2000 | Taylor | |
| 6,128,587 A * | 10/2000 | Sjolander | 703/2 |
| 6,555,802 B2 | 4/2003 | Osipchuk et al. | |
| 6,620,591 B1 | 9/2003 | Dunlay et al. | |
| 6,658,143 B2 | 12/2003 | Hansen et al. | |

(Continued)

FOREIGN PATENT DOCUMENTS

WO WO-94/11841 5/1994

OTHER PUBLICATIONS

I Do et al., Wavelet-Based Texture Retriveal Using Generalized Gaussian Density and Kullback-Leibler Distance. IEEE Transaction on Imaqe Processinoc. vol. 11, No. 2. 146-158J.*

(Continued)

*Primary Examiner* — Seyed Azarian
(74) *Attorney, Agent, or Firm* — Ropes & Gray LLP

(57) ABSTRACT

The invention generally provides methods and systems for determining characteristics of cellular structures. The methods include non-invasive, non-perturbing, automatable, and quantitative methods and may be applied to the examination of cells such as stem cells, embryos, and egg cells.

20 Claims, 24 Drawing Sheets

U.S. PATENT DOCUMENTS

| | | | |
|---|---|---|---|
| 6,727,071 | B1 | 4/2004 | Dunlay et al. |
| 7,085,765 | B2* | 8/2006 | Zock et al. .................... 702/19 |
| 7,086,350 | B2* | 8/2006 | Tecott et al. ................ 119/421 |
| 7,151,246 | B2* | 12/2006 | Fein et al. ................ 250/208.1 |
| 7,299,088 | B1* | 11/2007 | Thakor et al. ................ 600/544 |
| 2002/0025514 | A1 | 2/2002 | Jaworski et al. |
| 2003/0077569 | A1 | 4/2003 | Clausell et al. |
| 2003/0100024 | A1 | 5/2003 | Cassells et al. |
| 2003/0149535 | A1 | 8/2003 | Sudo et al. |
| 2003/0185450 | A1 | 10/2003 | Garakani et al. |
| 2004/0018485 | A1 | 1/2004 | Ravkin et al. |
| 2004/0063162 | A1 | 4/2004 | Dunlay et al. |
| 2004/0072254 | A1 | 4/2004 | Callamaras et al. |

OTHER PUBLICATIONS

Aapoloa et al., Epigenetic Modifications Affet Dnmt3L expression. Biochem. J. (2004) 380, 705-713.

Agustin et al., Robust Failure Detection for Reentry Vehicle Attitude Control Systems. Journal of Guidance, Control & Dynamics. vol. 22, No. 6. 839-845.

Allan S. Willsky. Multiresolution Markov Models for Signal and Image Processing. Proceedings of the IEEE, vol. 90. No. 8. 1396-1458.

Bovik et al., Multichannel Texture Analysis Using Localized Spatial Filters. IEEE Transactions on Pattern Analysis and Machine Intelligence., vol. 12, No. 1, 55-73.

Chang et al., Texture Analysis and Classification with Tree-Structured Wavelet Transform. IEEE Transactions on Image Processing. vol. 2., No. 4. 429-441.

Chellappa et al. Model-Based Texture Segmentation and Classification. Handbook of Pattern Recognition and Computer Vision (2nd Edition) 249-282.

Christopher G. Jeffreys. Support Vector Machine and Parametric Wavelet Based Texture Classification of Stem Cell Images. 1-121.

Christopher J.C. Burges, A Tutorial on Support Vector Machines for Pattern Recognition. Data Mining and Knowledge Discovery, vol. 2, 121-167.

Constantinescu et al. Lamin A/C Expression Is a Marker of Mouse and Human Embryonic Stem Cell Differentiation. Stem Cells 2006; 24: 177-185.

Desai et al., Diffusion Tensor Model Based Smoothing. IEEE 705-708.

Desai et al., Subspace Learning in Non-Gaussian Log-Concave Noise. IEEE 2364-2369.

Desai et al., Dual Redundant Sensor FDI Techniques Applied to the NASA F8C DFBW Aircraft.

Desai et al., Functional MRI Activity Characterization Using Response Time Shift Estimates From Curve Evolution. IEEE Transactions on Medical Imaging vol. 21, No. 11. 1402-1412.

Desai et al., Functional MRI Activity Characterization: An Estimation and Decision Theoretic Approach. Medical Imaging Systems Technology vol. 5, pp. 251-295.

Desai et al., Robust Gaussian and Non-Gaussian Matched Subspace Detection. IEEE Transaction on Signal Processing. vol. 51, No. 12. 3115-3127.

Dietterich et al., Solving Multiclass Learning Problems via Error-Correcting Output Codes. Journal of Artificial Intelligence Research 2. 263-286.

Do et al., Wavelet-Based Texture Retrival Using Generalized Gaussian Density and Kullback-Leibler Distance. IEEE Transaction on Image Processing. vol. 11, No. 2. 146-158.

Edger E. Osuna, Support Vector Machines: Training and Applications.

Haralick et al., Textural Features for Image Classification. IEEE Transactions on Systems, Man and Cybernetics. vol. SMC-3., No. 6. 610-621.

Hattori et al., Epigenetic Control of Mouse Oct-4 Gene Expression in Embryonic Stem Cells and Trophoblast Stem Cells. The Journal of Biological Chemistry. vol. 279. No. 17. 17063-17069.

Hermes et al. Feature Selection for Support Vector Machines. IEEE Computer Society vol. 2. 712-715.

Jain, A. K., et al., "Unsupervised Texture Segmentation Using Gabor Filters," Pattern Recognition, 24(12):1167-1186 (1991).

Jayant Shah. Gray Skeletons and Segmentation of Shapes. Computer Vision and Image Understanding 99 (2005) 96-109.

Kociolek et al. Discrete Wavelet Transform—Derived Features for Digital Image Texture Analysis. www.eletel.p.lodz.pl/cost.pdf_9.pdf.

Krupadanam et al., Multivariable Adaptice Control Design with Applications to Autonomous Helicopters. Journal of Guidance Control and Dynamics. vol. 25, No. 5. 843-851.

Laws, K. I., "Rapid Texture Identification," SPIE, Image Processing for Missile Guidance, 238:376-380.

Lee et al., Histone Deacetylase Activity is Required for Embryonic Stem Cell Differentiation. Genesis 38: 32-38.

Ma et al., A Comparison of Wavelet Transform Features for Texture Image Annotation. International Conference on Image Processing Oct. 23-25, 1995.

Mangoubi et al., A Robust Failure Detection and Isolation Algroithm. Proceedings of the 34th Conference on Decision & Control. 2377-2382.

Mao et al. Texture Classification and Segmentation Using Multiresoulution Simultanous Autoregressive Models. Pattern Recognition, vol. 25, No. 2. 173-188.

Mary M. Galloway. Texture Analysis Using Gray Level Run Lengths. Computer Graphics and Image Processing 4, 172-179.

Michael Unser., Sum and Difference Historgrams for Texture Classification. IEEE Tansactions on Pattern Analysis and Machine Intelligence. vol. Pami-8, No. 1 118-125.

Randen et al., Filtering for Texture Classification: A Comparative Study. IEEE Transactions on Pattern Analysis and Machine Intelligence. vol. 21, No. 4. 291-2310.

Reed et al., A Review of Recent Texture Segmentation and Feature Extraction Techniques. CVGIP: Image Understanding, vol. 57, No. 3, 359-372.

Rennie et al., Improving Multiclass Text Classification with the Support Vector Machine.

Robert M. Haralick. Statistical and Structure Approaches to Textrue. Proceedings of the IEEE, vol. 67., No. 5. 786-804.

Rui et al., Image Retrieval: Current Techniques, Promsing Directions, and Open Issues. Journal of Visual Communication and Image Representation 10. 39-62.

Ryan Michael Rifkin., Everything Old is New Again: A Fresh Look at Historical Approaches in Machine Learning. 1-225.

Smith et al., Transform Features for Texture Classification and Discriminaion in Large Image Databases.

Takahashi et al., Decision-Tree-Based Multiclass Support Vector Machines. Proceedings of the 9th International Conference on Neural Information Processing. vol. 3. 1418-1422.

Tuceryan et al., Texture Analysis. Handbook of Pattern Recognition and Computer Vision (2nd Edition) 207-248.

Wouwer et al. Statistical Texture Characterization from Discrete Wavelet Representations. IEEE Transactions on Image Processing., vol. 8, No. 4., 592-598.

* cited by examiner

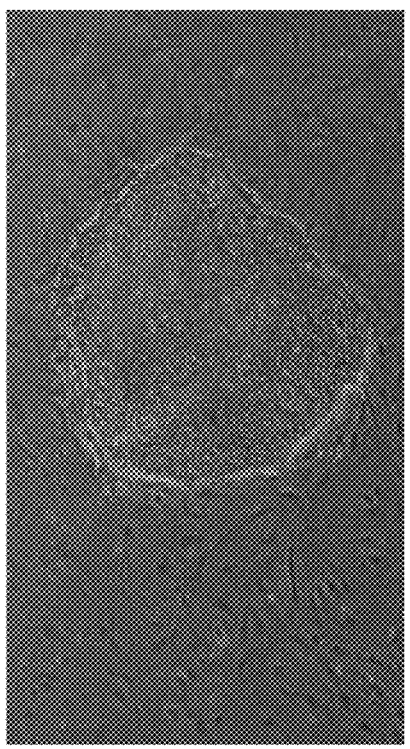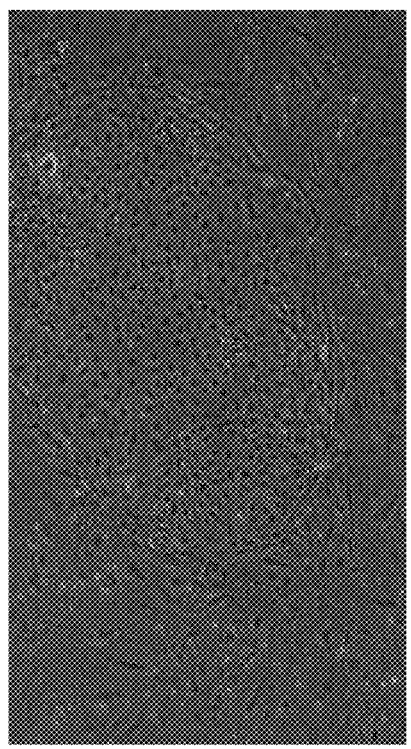
Fig.2

| Categories | 1/2 | 3 | 4 | 5 | | 1/2 vs. 3 vs. 4 vs. 5 |
|---|---|---|---|---|---|---|
| 1/2 vs. | | 74.4% 76.0% | 83.6% 87.1% | 92.6% 90.1% | | 63.1% 65.1% |
| 3 vs. | | | 84.0% 79.1% | 81.8% 76.9% | | |
| 4 vs. | | | | 84.5% 84.5% | | |

Fig. 18

| Categories | 1/2 | 3 | 4 | 5 | | 1/2 vs. 3 vs. 4 vs. 5 |
|---|---|---|---|---|---|---|
| 1/2 vs. | | 81.4% 81.0% | 90.5% 89.7% | 96.7% 94.3% | | 67.8% 68.8% |
| 3 vs. | | | 86.2% 84.0% | 88.0% 86.8% | | |
| 4 vs. | | | | 93.5% 92.4% | | |

Fig. 20

| Categories | 1 | 2 | 3 | 4 | 5 | | 1 vs. 3 vs. 5 |
|---|---|---|---|---|---|---|---|
| 1 vs. | | 48.4% 55.8% | 74.1% 71.8% | 69.3% 81.3% | 88.8% 85.6% | | 72.7% 70.9% |
| 2 vs. | | | 61.4% 62.9% | 60.0% 76.7% | 82.3% 84.6% | | 1 vs. 2 vs. 3 vs. 4 vs. 5 |
| 3 vs. | | | | 66.0% 60.0% | 85.5% 81.8% | | 40.6% 40.9% |
| 4 vs. | | | | | 87.8% 84.4% | | |

Fig. 21

| Categories | 1 | 2 | 3 | 4 | 5 | | 1 vs. 3 vs. 5 |
|---|---|---|---|---|---|---|---|
| 1 vs. | | 58.4% 63.7% | 80.0% 76.5% | 85.4% 92.0% | 95.0% 92.7% | | 76.4% 74.5% |
| 2 vs. | | | 67.7% 70.7% | 86.7% 87.5% | 93.8% 94.6% | | 1 vs. 2 vs. 3 vs. 4 vs. 5 |
| 3 vs. | | | | 85.6% 84.4% | 89.0% 93.0% | | 42.6% 44.7% |
| 4 vs. | | | | | 96.3% 94.4% | | |

Fig. 22

METHODS AND SYSTEMS FOR IMAGING CELLS

CROSS-REFERENCE TO RELATED APPLICATIONS

The present application is a continuation of U.S. patent application Ser. No. 11/128,612, filed May 13, 2005, now U.S. Pat. No. 7,711,174 which claims the benefit of U.S. Provisional Application No. 60/570,650, filed May 13, 2004, the disclosure of which is incorporated herein by reference in its entirety.

TECHNICAL FIELD

The invention relates, in general, to the field of cell imagery.

BACKGROUND

Many prior art methods for quantitatively measuring cell identity, such as immunocytochemistry (antibodies to marker proteins), gene arrays, and PCR (tests for mRNA characteristic of stem cells) are destructive tests that do not allow cells to continue growing.

Fluorescent methods for measuring cell identity can be non-destructive, but may be invasive or require perturbation of the cells. For example, flow cytometry requires the labeling of specific cell surface markers and single cell suspension in liquid culture. These disruptions can be very harsh and can result in the death of a majority of cells. Transgenic fluorescent techniques using fluorescent proteins can be performed in cells that remain alive but still require genetic perturbation of the organism. These and other approaches are appropriate when invasive markers of cell identity or quality are used to evaluate samples representative of larger populations of similar cells, but cannot be used to evaluate an entire population of cells that are needed for live cell growth and expansion. These techniques require measurements on a few cells thought to be representative of a larger population of cells and are subject to statistical error in heterogeneous samples.

Alternative non-destructive methods include, for example, visual inspections of the cells in a microscope. For example, stem cell lines must be monitored daily to determine which of the cultured colonies are sufficient for use in experiments and therapies. These human-based methods are non-quantitative and prone to the biases and errors of the human eye. They are also time consuming and labor intensive, and are therefore impractical in the case of high volume cell culture. Another limitation of inspector based methods is the inability to produce records of cell culture that can be compared from sample to sample over time, to promote reproducible biological products suitable for medical therapy or large scale biological experiments.

Thus, disadvantages of prior art methods (visual inspection) include that some are manual, time consuming and inconsistent, while others are invasive, destructive, or both.

SUMMARY

The application provides, in part, non-invasive, non-destructive, automatable systems and methods for determining various characteristics of a cell such as for example, the viability of a cell, the plasticity/stemness of a cell, the rate of proliferation and/or differentiation of a cell, the suitability for fertilization, and/or the suitability of implantation into the uterus. In one aspect the invention provides a system for determining these characteristics of a cell thereby allowing classification of a given cellular structure. As an example, such a system comprises: capturing an image of a cellular structure; deriving a plurality of numerical image features from said image; and classifying the cellular structure according to a statistical cellular structure classification model based on the derived image features. As used herein, the term "cellular structure" includes any type of cell, a cellular organelle, a cell culture, or any other discernible two- or three-dimensional biological or cellular structure. The cellular structure may be single or multicellular, prokaryotic or eukaryotic, mammalian (e.g., mouse, rodent, primate, or human) or non-mammalian. In one aspect, the cellular structure may be an egg cell, an embryo, a stem cell, a differentiated cell, a tumor cell, a colon cell, a breast cell, a lung cell, a prostate cell, a pancreatic cell, a kidney cell, an endometrial cell, a cervical cell, an ovarian cell, and a thyroid cell. In another aspect, the cellular structure may be a cell colony. In yet another aspect, the cellular structure is an organelle such as a nucleus, cell membrane, cell wall, mitochondria, golgi, chromatin, DNA, cytoskeleton, ribosome, and endoplasmic reticulum.

The invention, in another embodiment, is generally directed to an automatable, quantitative method for determining the value of cells in culture in a non-invasive, non-perturbing and nondestructive way for use in medical therapy, tissue engineering and biological experimentation. The value of a cell may include any physiological or phenotypic information associated with a cell, such as the viability of a cell, the plasticity/stemness of a cell, the rate of proliferation and/or differentiation of a cell, the suitability for fertilization, and/or the suitability of implantation into the uterus. The value of a cell may be obtained by classifying a cellular structure of the cell, and may include the steps of capturing an image of a cellular structure, deriving a plurality of numerical image features from said image, and classifying the cellular structure according to a statistical cellular structure classification model based on the derived image features.

As used herein, the term "image features" includes but is not limited to the physiological or numerical representations of a cellular border, a colony border, a cell membrane, cell texture, and colony textures. In certain embodiments, the image features may include a kinetic or spatiotemporal component. Kinetic or spatiotemporal components include visual changes in the image features described above over a given period of time. The changes in the image features over a given period of time may then be correlated to changes in the viability of the cellular structures, the loss or gain of plasticity or stemness of the cellular structures, the loss or gain of implantability, and the loss or gain of the suitability for fertilization of these cells. In certain aspects, the visual changes may be captured in time periods that may be as frequent as 1 image per second or 1 image per minute. The changes in the image features may be observed over a period of one minute, an hour, two hours, fours hours, 8 hours, 24, hours, 48 hours, and so on; the only constraint on the time period being the viability of any given cellular structure in a culture medium.

In certain embodiments, the application provides methods that are capable of providing high resolution because the period between capturing images may be as little as 0.0001 seconds and as long as 3-6 months.

In some embodiments, the method further comprises combining external cellular structure data, such as for example, information regarding the source of the cellular structures, growth conditions, media conditions, prehistory of the cellular structure, or other image analysis data with derived image features.

In another embodiment, the image features of the invention may be derived by a texture analysis method. Exemplary texture analysis methods include, without limitation, wavelet decomposition, multiresolution analysis, time frequency analysis, dilate and erode, co-occurrence matrices, Fourier spectral analysis, Gabor methods, wavelet packet decomposition, statistical analysis of wavelet coefficients, Markov Random fields, autoregression models, spatial domain filters, Fourier and Wavelet domain filters, and texture segmentation.

In some embodiments, the image features of the invention are derived in a multi-tiered hierarchical cellular structure paradigm, wherein the first tier derives a plurality of numerical image features at the pixel level; progressive tiers derive a plurality of numerical image features in increasing image resolutions; and the final tier derives a plurality of numerical image features at the cellular structure level. In one aspect, the image features are derived in a two-tiered hierarchical cellular structure paradigm, wherein the first tier derives a plurality of image features at the pixel level, and wherein the second tier derives a plurality of image features at the cellular structure level.

In yet another embodiment, the cellular structure is classified by a statistical cellular structure classification model that utilizes a parametric or a non-parametric class algorithm, or combinations thereof Exemplary parametric and non-parametric class algorithms include Bayes classifiers, discriminant analysis, Parzen windows, multiple hypothesis testing, neural networks, k-nearest neighbors, decision trees, hierarchical clustering, fuzzy methods, component analysis, Kullback-Leibler Distances, and support vector machines.

In another embodiment, the invention provides a computer readable medium having computer readable program codes embodied therein for determining one or more characteristics of a cell. It will be apparent to the skilled artisan that the computer readable medium may convert the captured images into graphical or numerical representations and may implement any one of the statistical classification methods.

In another embodiment, the invention provides a system for determining one or more characteristics of a cell, comprising: a device for deriving a plurality of numerical image features from an image; and a device for classifying a cellular structure according to a cellular structure model based on the derived image features. The system for classifying a cellular structure may further include a device for capturing an image of the cellular structure.

In another embodiment, the invention provides a system for monitoring the development of a cell in a given environment, comprising: an image input system for automatically capturing images of a cellular structure; an image analysis module for deriving a plurality of numerical image features from said images; and a cellular structure classification module for classifying the cellular structure according to a statistical cellular structure model based on the derived image features. In some aspects, the system may further comprise a plurality of sensors for monitoring a plurality of corresponding conditions of the environment. Exemplary sensors include, without limitation, temperature sensors, humidity sensors, pH sensors, oxygen sensors, carbon dioxide sensors, and nutrient sensors. In another aspect, the system may also comprise a classification tracking module for maintaining data reflecting environmental conditions detected by the plurality of sensors and the classification of the cellular structure.

In yet another embodiment, the invention provides a system for managing the development of a cell in an environment, the system comprising: an image capture device for generating images of a cellular structure; an image analysis module for deriving a plurality of numerical image features from said images; a cellular structure classification module for classifying the cellular structure according to a statistical cellular structure model based on the derived image features; and an environmental control module for altering a condition of the environment based on the classification assigned by the cellular structure classification module. In some aspects, the system may further comprise a plurality of sensors for monitoring a plurality of corresponding conditions of the environment. In other aspects, the system may further comprise a classification tracking module maintaining data reflecting environmental conditions detected by the plurality of sensors and the classification of the cellular structure. Exemplary sensors for monitoring environmental conditions may include, without limitation, a temperature sensor, a humidity sensor, a pH sensor, an oxygen sensor, a carbon dioxide sensor, or a nutrient sensor. In another aspect, the system may further comprise a sensor control module for recognizing abnormalities in the plurality of sensors and altering the conditions of the plurality of sensors.

In another embodiment, the invention provides a method of determining the biological state of a cell, comprising: capturing an image of a cellular structure; deriving a plurality of phyiological or numerical image features from said image; classifying the cellular structure according to a statistical cellular structure classification model based on the derived image features; and associating said cellular structure classification with external biological data, thereby determining the biological state of a cellular structure. The biological state of any cellular structure may be determined. Exemplary cells include, without limitation, stem cells, egg cells, embryos, and tumor cells. Exemplary biological states include, the viability of a cell, the stemness or plasticity of a cell, the rate of proliferation of a cell, the state of differentiation, suitability for fertilization, implantation in the uterus, and the tumoricgenic state.

In other embodiments, the invention provides a system for determining the stemness of a given population of stem cells, comprising: an image input for automatically generating images of the cellular structure; an image analysis module for deriving a plurality of image features from said images; a cellular structure classification module for classifying the cellular structure according to a statistical cellular structure model based on the derived image features; and a biological status module for associating said cellular structure classification with external biological data, thereby determining the stemness of a population of stem cells. In certain embodiments, the application provides methods for determining whether a given population of stem cells is developing along a particular lineage, such as for example, an endothelial lineage, a hematopoietic lineage etc.

The embodiments and practices of the present invention, other embodiments, and their features and characteristics, will be apparent from the description, figures and claims that follow, with all of the claims hereby being incorporated by this reference into this Summary.

BRIEF DESCRIPTION OF THE DRAWINGS

FIG. 2 shows images of stem cell colonies. The top image is a photomicrograph of a good stem cell colony and shows homogenous/smooth texture, fine/tight texture, and a sharp and defined border. The bottom image is a photomicrograph of a bad stem cell colony and displays heterogeneous and loose texture, with an undefined, uncircular border.

FIG. 18 shows a chart of four-way mean optimal border effects performance matrix. For each category comparison, the first percentage reflects border feature exclusion and the second number reflects inclusion. Category comparisons for which the use of border features either does not change or improves performance are shaded.

FIG. 20 shows a chart of the four-way individual optimal border effects performance matrix, comparing the border exclusion and inclusion for the individual optimal case.

FIG. 21 shows a chart of the five-way mean optimal performance matrix. This matrix shows the categorization rates both excluding (first percentage) and including (second percentage) border features for each category comparison. If the border features either increase or have no effect on the categorization rate for a specific comparison, the associated cell is shaded FIG. 22 shows a chart of the five-way individual optimal performance matrix. This matrix shows the categorization rates both excluding (first percentage) and including (second percentage) border features for each category comparison. If the border features either increase or have no effect on the categorization rate for a specific comparison, the associated cell is shaded.

DESCRIPTION OF AN ILLUSTRATIVE EMBODIMENT

To provide an overall understanding of the invention, certain illustrative embodiments will now be described, including a system and a method for classifying a cellular structure. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof The invention, in one embodiment, is generally directed to an automatable, quantitative method for determining the value of cells in culture in a non-invasive, non-perturbing and non-destructive way for use in medical therapy, tissue engineering and biological experimentation. According to one feature, the value of cells is determined by quantifying the quantity, quality, heterogeneity and/or suitability for use in medicine or biology.

Figure 1:
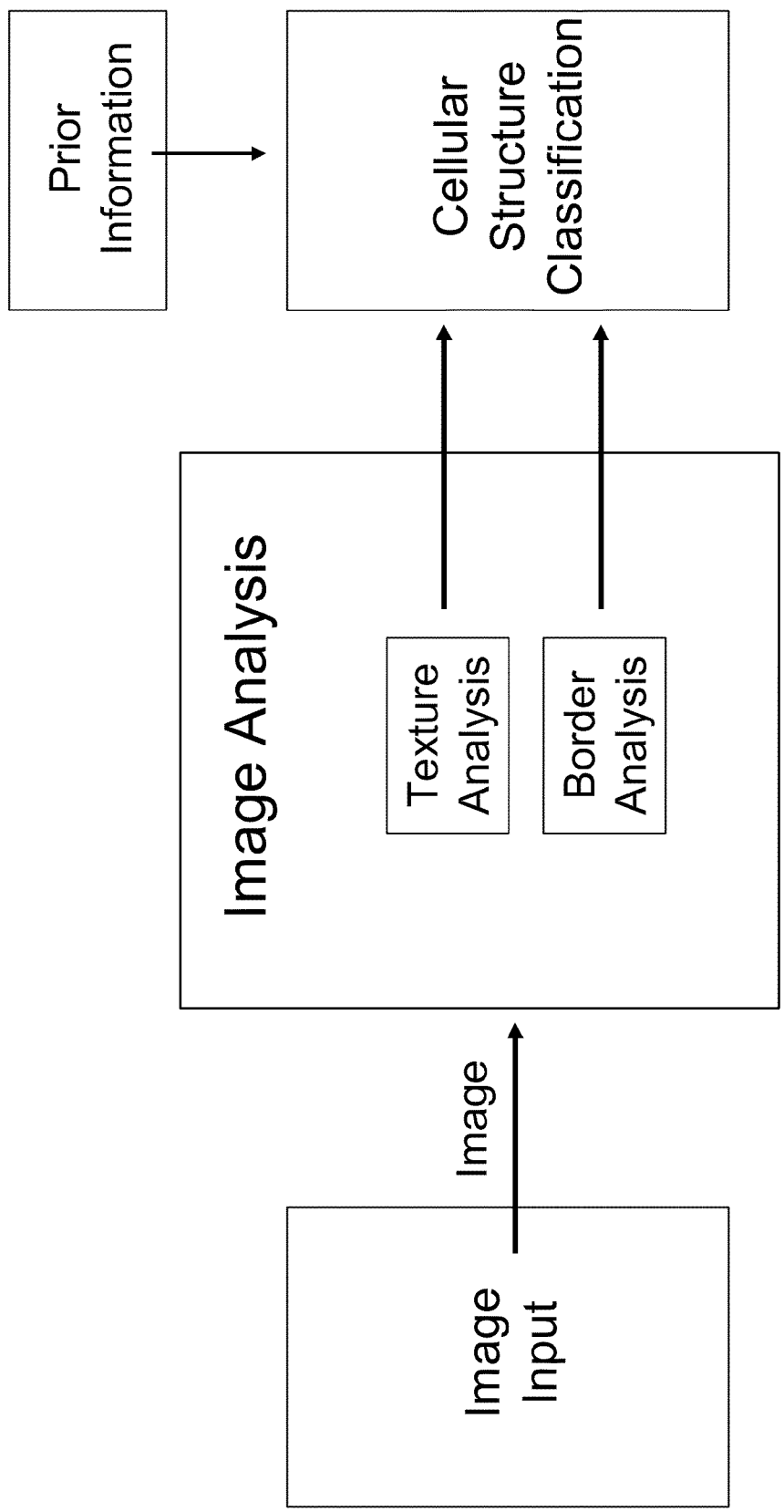
FIG. 1 shows a schematic of a cellular structure classification system.

FIG. 1 shows a schematic of a cellular structure classification system ("the classification system") according to an illustrative embodiment of the invention. The classification system includes an image input device, an image analysis module for deriving a plurality of image features from the images input, and a cellular structure classification module ("classification module") for classifying the cellular structure according to a statistical cellular structure model based on the derived image features. The classification system may include a user interface operatively associated with the computer. The image analysis and classification modules are preferably implemented as computer readable instructions executable on one or more general or special purpose computers. The computer preferably includes a storage device for storing data collected and used by the image analysis module.

The user interface includes standard user interface components, such as a keyboard, mouse, and external media drive. A PC screen operatively associated with the computer means, for displaying data (e.g., graphs) and images of cells may also be used. The computer may also have a network connection for linking to external storage devices and for making the image analysis module available to act as a server in a client-server configuration. In such a configuration, a user at a client computer can request information to be extracted from user-supplied input.

Samples and Cellular Structures

The methods of the present invention are not limited to any particular type of cellular structures. Specific biological samples evaluated include, without limitation, the developmental potential of human and animal eggs, embryos and stem cells. In some embodiments, the cellular structure used in the methods described herein may be eukaryotic or prokaryotic, from a metazoan or from a single-celled organism such as yeast. In some preferred embodiments the cellular structure is a mammalian cell, such as a cell from a rodent, a primate or a human. The cell may be a wild-type cell or a cell that has been genetically modified by recombinant means or by exposure to mutagens. The cell may be a transformed cell or an immortalized cell. In some embodiments, the cell is from an organism afflicted by a disease. In some embodiments, the cell comprises a genetic mutation that results in disease, such as in a hyperplastic condition.

In another embodiment, the cellular structure is a stem cell, an egg cell, an embryo, colon, breast, lung, prostate, pancreas, kidney, endometrium, cervix, ovary, or thyroid cell. In another embodiment, the cell is a tumor cell, such as a cell derived from a fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, colon carcinoma, pancreatic cancer, uterine cancer, breast cancer including ductal carcinoma and lobular carcinoma, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, meningioma, melanoma, neuroblastoma, leukemias, lymphomas, and multiple myelomas.

In some embodiments, the cellular structure may be mature, fully mature, or differentiated. In another embodiment, the cells may be stem cells and/or progenitor cells that may be pluripotent or multipotent (i.e. giving rise to a plurality or multiplicity of mature cell types), or unipotent (i.e. committed to a particular lineage path yielding a single type of mature cell). Where either term is used separately herein, it is to be understood that unless specifically stated otherwise, both stem cells and progenitor cells may potentially be used or derived and that samples or solutions of "stem cells" may potentially also include progenitor cells. "Fully mature cells" as used herein refers to differentiated cells that represent a final or near final stage of development for a given cell lineage. "Differentiated cells" as used herein refers to cells of a particular lineage that are more mature than stem cells and progenitor cells but are not necessarily at their final developmental stage. The term "mature cells" as used herein encompasses fully mature (i.e. fully developed and terminally differentiated) cells and can also include, in some embodiments, differentiated cells that are not fully mature. Mature cells are not typically capable of self-replication.

The stem cell containing suspensions useful in the context of the present invention may be derived from a variety of sources including, but not limited to, bone marrow, mobilized or unmobilized peripheral blood, umbilical cord blood, fetal liver tissue, other organ tissue, skin, nerve tissue, solid tumors, etc. A variety of stem/progenitor cell types may be evaluated according to the methods of the invention, including but not limited to, lympho-hematopoietic stem cells, multipotent or pluripotent stem cells, mesenchymal stem cells, epithelial stem cells, gut stem cells, skin stem cells, neural stem cells, liver progenitor cells, and endocrine progenitor cells.

Samples are routinely grown in transparent plastic or glass vessels that can be viewed in a microscope to evaluate the appearance, distribution and morphology of cells. When evaluating the cellular phenotype of a sample of cells in a high-throughput manner, arrays of cells may be prepared for parallel handling of cells. Standard 96 well microtiter plates, for example those that are 86 mm by 129 mm, with 6 mm diameter wells on a 9 mm pitch, may be used for compatibility with current automated loading and robotic handling systems. Microtiter plates in other well configurations may also be used. The microplate is typically 20 mm by 30 mm, with cell locations that are 100-200 microns in dimension on a pitch of about 500 microns. Methods for making microplates are described in U.S. Pat. No. 6,103,479, incorporated by reference herein in its entirety. Microplates may consist of coplanar layers of materials to which cells adhere, patterned with materials to which cells will not adhere, or etched 3-dimensional surfaces of similarly pattered materials. For the purpose of the following discussion, the terms 'well' and 'microwell' refer to a location in an array of any construction to which cells adhere and within which the cells are imaged. Microplates may also include fluid delivery channels in the spaces between the wells. The smaller format of a microplate increases the overall efficiency of the system by minimizing the quantities of the reagents, storage and handling during preparation and the overall movement required for the scanning operation. In addition, the whole area of the microplate can be imaged more efficiently.

Image Input

The image input device may include an image capture device in one embodiment. In one implementation, an image capture device may include a microscope or other high magnification optical system having an objective lens, an XY stage adapted for holding a plate containing a cell sample or an array of samples, a means for moving the plate to align the samples with the microscope objective and for moving the sample in the direction to effect focusing, a digital camera, a detection system with a light source for directing light to cells in the sample locations, a means for directing light emitted from the cells to the digital camera, and a computer means for receiving and processing digital data from the digital camera. Any optical method may be used, such as bright field, dark field, phase contrast and interference contrast. For illustrative purposes, phase contrast images of human embryonic stem cells and Hoffman Modulation contrast images of non-human primate eggs have been selected. The computer means may include: i) a digital frame grabber for receiving the images from the camera, ii) a display for user interaction and display of assay results, iii) digital storage media for data storage and archiving, and iv) means for control, acquisition, processing and display of results. When the sample contains live cells, the imaging system may further include a chamber and control system to maintain the temperature, pH, $CO_2$ and/or oxygen concentration, and humidity surrounding the samples.

The image of the sample may be a still photo or a video in any format (e.g., bitmap, Graphics Interchange Format, JPEG file interchange format, TIFF, or mpeg). In other implementations, the image of the sample may be captured by an analog camera and converted into an electronic form by computer means In other implementations, the image capture device may include imaging systems, confocal or light microscopes, or cell screening systems known in the art, such as those described in U.S. Pat. Nos. 6,727,071, 6,620,591, 5,526,258, 5,989,835, 4,905,296, 6,658,143 and 6,555,802 and U.S. Patent Publication Nos. 2003/0100024, 2003/0149535, 2003/0185450, 2004/0072254, 2004/0018485, 2003/0077569, 2002/0025514, 2004/0063162 and International PCT application No. WO94/11841, the entire teachings of which are incorporated by reference herein. For example, U.S. Pat. No. 5,989,835 describes the identification of cells on microtiter plates based on the staining with a fluorescent dye while U.S. Pat. No. 4,905,296 describes a system for shape recognition.

For image acquisition, the camera's exposure time may be separately adjusted to ensure a high-quality image. Software procedures may be called, at the user's option, to correct for registration shifts between wavelengths by accounting for linear (X and Y) shifts between wavelengths before making any further measurements. Each image may contain a single cellular structure or multiple cellular structures.

In other implementations, the image input may alternatively include a data source that stores images, such as an internal or external drive, a network connection to an external drive, a flash memory card or any other device capable of storing images.

For data visualization, a "quality movie" concept may be used. A quality movie is a graphical output of a series of images that shows the emergence of characteristic changes in a cellular structure. The quality movie may include a dynamic representation of the locally normalized confidence reclassified image. The frames are created by imposing various thresholds on the locally normalized confidence reclassified image. As the movie is played, the changes in the cellular structure are visualized.

Image Analysis Module

The image analysis module receives images from the image input and extracts these images into features which can be used for statistical cellular structure classification. More particularly, image features are extracted by a texture analysis module, a border analysis module, or both. The image analysis module may be implemented as computer readable program codes (e.g., software). In other implementations, the image analysis module is implemented into a digital signal processor (DSP), application specific processor (ASP), or other integrated circuits.

An image is analyzed according to image features contained within an image. As shown in FIG. 2, in the case of stem cell colony features, cellular structure textures can be characterized, for example, as homogenous or heterogeneous, smooth, fine, or tight or loose. Cellular structure borders may be sharp or undefined. Exemplary image features may be single or multicellular in nature and include cell texture, colony texture, cellular border, colony border, cell membrane, neural rosettes, blood islands, cell colonies or aggregates, or any discernible two- or three-dimensional cellular structure. In some implementations, image features include components of cell cytoplasm or cellular organelles, or portions thereof, such as a nucleus, cell membrane, cell wall, mitochondria, golgi, chromatin, DNA, cytoskeleton, or endoplasmic reticulum. Image features may include biomolecular markers (e.g., Oct-4 or Nestin distribution) or the expression pattern of biomarkers or recombinant proteins that emit a signal (e.g., Green Fluorescent Protein). Features can be modeled statistically for use with a parametric classifier, or can be used as is with non-parametric classifiers such as neural networks, and support vector machines (SVM). Both parametric and non-parametric methods may be combined. Border crispness, another feature that testifies to the quality of a stem cell colony, can be estimated using state of the art simultaneous segmentation and smoothing techniques.

A third level of analysis is done to specific interfaces between heterogeneous domains in the sample. Domains may be components of cell cytoplasm, or may be multi-cellular domains of cell aggregates, colonies or embryos. Biological domains within images are defined by delineating borders. Borders themselves have qualities such as linear, curvilinear or stochastic in the circumferential direction as is well known. Borders can also be described as crisp or diffuse, with specific granularity or texture (applicable to border domains, or annuli around each biological domain). The border qualities are of special biological interest since the interface between different domains is a rich source of high quality information about state changes in biological differentiation and development.

Borders can be defined for the purpose of segmentation in the following way: an ensemble of pixels such that, every neighborhood of every pixel contains pixels that are both inside the region, and outside. Specific qualities of border for the purpose of evaluating domain transitions can be measured in the following way: border smoothness, border crispness, and border regions pixel intensity statistics.

The quantitative characterization of the concept of stem cell border crispness intends to characterize the percentage of pixels belonging to the border region that contain both texture pixels and non-texture pixels as neighbors on both sides. The variational segmentation/curve evolution approach, by yielding the strength and spatial density of the edge field, can also yield an additional measure of crispness. Other quantitative characteristics of borders include smoothness. These rely on variational curve evolution segmentation techniques, and a subsequent analysis, based for instance, on Fourier descriptors. Multiresolution extensions using wavelets are also possible.

Another feature of the invention is the heuristic, hierarchical architecture to determining texture classifiers. First, images are analyzed on the pixel level and at the pixel neighborhood (Tier 1). This data is presented graphically in a way that biologist can evaluate biological qualities of the sample being imaged. Second, domains within the sample are defined by separate, non-textural methods to aid in producing textural evaluations in heterogeneous samples (Tier 2). At Tier 2, it is also possible to incorporate additional useful information such as: border quality, prior information, and even subjective evaluations. Texture, border, and other measurements specific to domains in the image provide discriminating information about different spatially distinct biological domains found in heterogeneous samples.

In one aspect, the hierarchical architecture integrates known tools and information to yield system demonstrating superior classification and characterization performance. This method includes the fusion of information from images of different resolution and modalities together with the incorporation of prior information (past history of the same and other colonies, etc.) and the generation, selection and combining of various features.

The texture analysis module that is included with in the image analysis module may extract image texture on a local image window extracted from a full image, rather than being defined on the entire image or on each individual pixel. Thomas Wagner. Texture analysis. In Bernd Jahne, Horst Haussecker, and Peter Geissler, editors, Handbook of Computer Vision and Applications. Academic Press, San Diego, 1999. As used herein, texture is a neighborhood operator. Other common neighborhood operations include convolution, dilation and median filtering. Image Processing Toolbox User's Guide. The MathWorks, Inc., Natick, Mass., Third edition, 2001.

Figure 3:
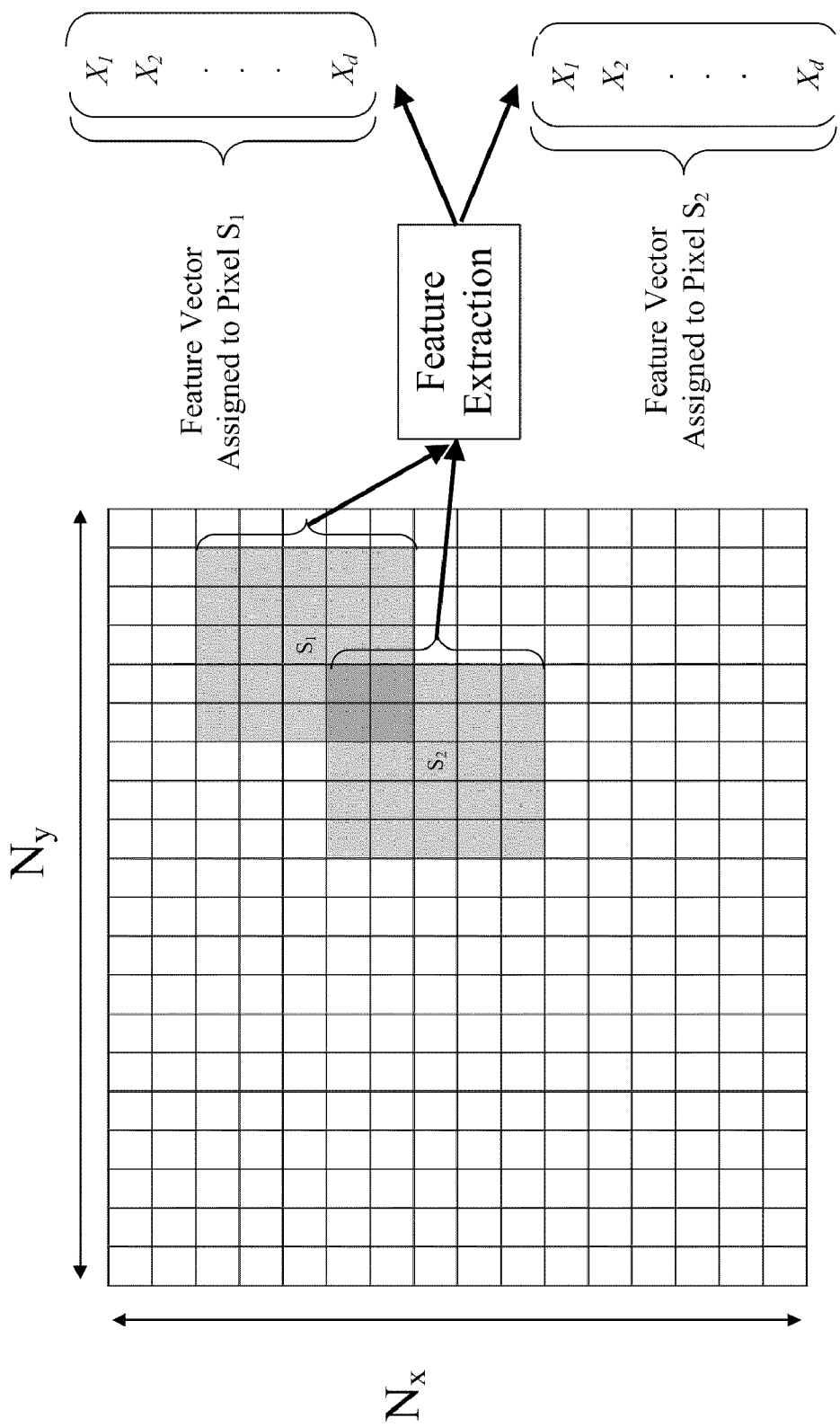
FIG. 3 shows a schematic of the sliding neighborhood method of image feature extraction. In the sliding neighborhood method a window is defined around an individual pixel and the neighborhood operator's applied to that window and the resulting output is assigned to the individual pixel itself

Analysis with neighborhood operators may be performed in a number of ways such as for example a distinct block and sliding neighborhood method. In the distinct block method, the full image is divided into non-overlapping windows. The neighborhood operator is then applied to each window and the resulting output assigned to all pixels in the analyzed window. Image Processing Toolbox User's Guide. The MathWorks, Inc., Natick, Mass., Third edition, 2001. In the sliding neighborhood method a window is defined around an individual pixel and the neighborhood operator's applied to that window and the resulting output is assigned to the individual pixel itself Image Processing Toolbox User's Guide. The MathWorks, Inc., Natick, Mass., Third edition, 2001. This method allows the one to assign neighborhood features to specific pixels, as shown in FIG. 3.

To further illustrate, the sliding neighborhood method can be used to pinpoint regions of good and bad quality in stem cell colonies. By using the sliding neighborhood method, each pixel in stem cell colony images can be classified as good or bad, thus creating higher resolution segmentations of the images. As would be apparent to the skilled artisan, the use of the non-overlapping distinct block method would assign, all pixels within a given window block the same textural representation.

Once a window is extracted around a specific pixel, that window can be analyzed to calculate its textural feature representation. Common textural feature representations are highlighted below by grouping them into four major paradigms: statistical, structural, model-based and signal processing methods. More in-depth surveys of the methods and further references can be found in the literature. Anil K. Jain. Fundamentals of Digital Image Processing. Prentice Hall, Englewood Cliffs, N.J., 1989. Trygve Randen and John Hakon Husoy. Filtering for texture classification: a comparative study. IEEE Transactions on Pattern Analysis and Machine Intelligence, 21(4):291-309, April 1999. Todd R. Reed and J. M. Hans du Buf. A review of recent texture segmentation and feature extraction techniques. CVGIP: Image Understanding, 57(3):359-372, May 1993. Yong Rui, Thomas Huang, and Shih-Fu Chang. Image retrieval: Current techniques, promising directions and open issues. Journal of Visual Communication and Image Representation, 10(4):39-62, April 1999. Mihran Tuceryan and Anil K. Jain. Texture analysis. In C. H. Chen, L. F. Pau, and P. S. P. Wang, editors, Handbook of Pattern Recognition & Computer Vision, volume 2, pages 207-248. World Scientific, Singapore, 1999. Thomas Wagner. Texture analysis. In Bernd Jahne, Horst Haussecker, and Peter Geissler, editors, Handbook of Computer Vision and Applications. Academic Press, San Diego, 1999.

Statistical Paradigm

The statistical paradigm describes texture in terms of the statistical distribution of the grayscale pixel values within an image. Haralick's co-occurrence matrix approach is the most common of these methods, and we outline his method briefly here to provide insight into this class of feature representations.

Let $s_1=(x_1, y_1)$ and $s_2=(x_2, y_2)$ be two pixels in the image, and let $s_1$ and $s_2$ be separated by a displacement of $d=(d_x, d_y)$ pixels so that $$s_2 = (x_2, y_2) = (x_1 + d_x, y_1 + d_y) = s_1 + d \qquad (2.5)$$

For a fixed displacement d, statistical methods assume that the probability that $s_1$ and $s_2$ take on grayscale values of i and j, respectively, is governed by the joint probability mass function (PMF) P(i, j; d). We may equivalently reference the separation displacement between $s_i$ and $s_2$ by an absolute distance d and angle θ relative to the horizontal axis. The PMF of the spatial grayscale values becomes in this case P(i, j; d, θ). Robert M. Haralick, K. Shanmugam, and Its'Hak Dinstein. Textural features for image classification. IEEE Transactions on Systems, Man and Cybernetics, 3(6):610621, 1973. Michael Unser. Sum and difference histograms for texture classification. IEEE Transactions on Pattern Analysis and Machine Intelligence, 8(1):118-125, January 1986.

Since the true grayscale distribution P(i, j; d, θ) is not know, it is estimated from empirical data. Haralick accomplishes this with the so-called co-occurrence matrices. For an image I of size $N_x \times N_y$, with the set of distinct grayscale values $G=\{1, 2, \ldots, N_g\}$, Haralick's method creates symmetric co-occurrence matrices P(i, j; d, 0) with i, j ∈ G specifying grayscale values, θ ∈ {0°, 45°, 90°, 135°} defining an angular direction and d representing the user-defined pixel distance. The (i, j) entry of P(i, j; d, θ) holds the total number of pixel pairs in the image, normalized by the total number of pixels in the image, with grayscale values i and j such that the two pixels in the pairs lie d pixels apart in the angular direction θ. Robert M. Haralick, K. Shanmugam, and Its'Hak Dinstein. Textural features for image classification. IEEE Transactions on Systems, Man and Cybernetics, 3(6):610621, 1973. Thus, for any specified d value, the method produces four co-occurrence matrices, one for each of the four θ values specified above. The value of d specifies the size of the neighborhood over which it is feasible to estimate the PMF of the grayscale distribution. The resulting co-occurrence matrices serve as an estimate of the true grayscale distribution of the image.

From these co-occurrence matrices, Haralick defines 14 textural features. Table 2.1 shows the four most common features. Robert M. Haralick, K. Shanmugam, and Its'Hak Dinstein. Textural features for image classification. IEEE Transactions on Systems, Man and Cybernetics, 3(6):610621, 1973. In the table, $\sigma_x, \mu_x, \sigma_y, \mu_y$ are the standard deviations and means of the marginal distributions P(i; d, θ)=$\Sigma_j$(i, j; d, θ) and P(j; d, θ)=$\Sigma_i$ P(i, j; d, θ), respectively.

TABLE 2.1

Haralick's Statistical Texture Features

| Textural Feature Name | Formula |
|---|---|
| Angular Second Moment | $\Sigma_i \Sigma_j (\hat{P}(i, j; d, \theta))^2$ |
| Contrast | $\Sigma_{n=0}^{N_g-1} n^2 \{\Sigma_i \Sigma_{j|i-j|=n} (\hat{P}(i, j; d, \theta))\}$ |
| Correlation | $\dfrac{\Sigma_i \Sigma_j (ij) \hat{P}(i, j; d, \theta) - \mu_x \mu_y}{\sigma_x \sigma_y}$ |
| Entropy | $\Sigma_i \Sigma_j \hat{P}(i, j; d, \theta) \log(\hat{P}(i, j; d, \theta))$ |

In an attempt to speed up the implementation of Haralick's method by replacing the double summations in the co-occurrence features of Table 2.1 with single summations, Unser proposes using sum and difference histograms to estimate the joint grayscale distribution. These sum and difference histograms allow for the exact computation of nine of Haralick's 14 textural features and the estimation of the remaining five features. Michael Unser. Sum and difference histograms for texture classification. IEEE Transactions on Pattern Analysis and Machine Intelligence, 8(1):118-125, January 1986.

Another statistical method is Galloway's gray level run length approach. The basic idea of this approach is that texture can be characterized by first identifying strings of adjacent pixels having the same grayscale value. After calculating the length of these strings for various grayscale values and spatial orientations, five textural features can be calculated. Mary M. Galloway. Texture analysis using gray level run lengths. Computer Graphics and Image Processing, 4:172-179, 1975.

Structural Paradigm

The structural paradigm measures the spatial distribution of blocks of pixels called textural primitives. The underlying assumption of structural methods is that the image texture is indeed composed of these distinct textural primitives, rather than simply exhibiting a continuous distribution of grayscale values. The structural approach consists of two steps (Mihran Tuceryan and Anil K. Jain. Texture analysis. In C. H. Chen, L. F. Pau, and P. S. P. Wang, editors, Handbook of Pattern Recognition & Computer Vision, volume 2, pages 207-248. World Scientific, Singapore, 1999):

1. Identify and extract the textural primitives; and
2. Infer the placement rule that governs the distribution of the primitives across the image In general, specific methods of the structural paradigm do not receive as much attention as those of other paradigms. The main reason for this is that many textures do not actually satisfy the assumption of the presence of repeating primitives (Todd R. Reed and J. M. Hans du Buf. A review of recent texture segmentation and feature extraction techniques. CVGIP: Image Understanding, 57(3):359-372, May 1993) and those that do are too regular to be of much real-world interest. Jianchang Mao and Anil K. Jain. Texture classification and segmentation using multiresolution simultaneous autoregressive models. Pattern Recognition, 25(2):173188, 1992.

Details on various structural methods can be found in the literature. Robert M. Haralick. Statistical and structural approaches to texture. In Proc. IEEE, volume 67, pages 786-804, 1979. Mihran Tuceryan and Anil K. Jain. Texture analysis. In C. H. Chen, L. F. Pau, and P. S. P. Wang, editors, Handbook of Pattern Recognition & Computer Vision, volume 2, pages 207-248. World Scientific, Singapore, 1999. In fact, Haralick even describes methods that combine the statistical and structural paradigms. Robert M. Haralick. Statistical and structural approaches to texture. In Proc. IEEE, volume 67, pages 786-804, 1979. One benefit of the structural paradigm is that if accurate primitives can be identified, texture synthesis reduces to the relatively simple task of replacing the primitives according to the inferred placement rule. Mihran Tuceryan and Anil K. Jain. Texture analysis. In C. H. Chen, L. F. Pau, and P. S. P. Wang, editors, Handbook of Pattern Recognition & Computer Vision, volume 2, pages 207-248. World Scientific, Singapore, 1999.

Model-Based Paradigm

The model-based paradigm assumes an image texture model, fits that model to the image being analyzed and uses the model parameters as the textural features of the image. Trygve Randen and John Hakon Husoy. Filtering for texture classification: a comparative study. IEEE Transactions on Pattern Analysis and Machine Intelligence, 21(4):291-309, April 1999. One of the most prevalent model-based approaches involves extracting the multi-resolution autoregressive (AR) features of Mao and Jain. In this method, multiple neighborhoods of various sizes are defined about a pixel, the AR model is fit to those neighborhoods and the model parameters are estimated. The feature representation for the pixel consists simply of all the resulting model parameters. Jianchang Mao and Anil K. Jain. Texture classification and segmentation using multiresolution simultaneous autoregressive models. Pattern Recognition, 25(2):173188, 1992.

Another more complex model-based method involves modelling an image as a Markov random field (MRF). This approach basically involves defining two Markov processes. The label process $\{L_s \in N\}$ defines the pixel class label within a neighborhood N around the pixels. The intensity process $\{Y_s, s \in N\}$ governs the distribution of grayscale values about s within N. R. Chellappa, R. L. Kashyap, and B. S. Manjunath. Model-based texture segmentation and classification. In C. H. Chen, L. F. Pau, and P. S. P. Wang, editors, Handbook of Pattern Recognition & Computer Vision, pages 249-282. World Scientific, Singapore, Second edition, 1999. Further details on the MRF and other model-based approaches can be found in the literature. R. Chellappa, R. L. Kashyap, and B. S. Manjunath. Model-based texture segmentation and classification. In C. H. Chen, L. F. Pau, and P. S. P. Wang, editors, Handbook of Pattern Recognition & Computer Vision, pages 249-282. World Scientific, Singapore, Second edition, 1999. Todd R. Reed and J. M. Hans du Buf. A review of recent texture segmentation and feature extraction techniques. CVGIP: Image Understanding, 57(3):359-372, May 1993.

Signal Processing Paradigm

Figure 4:
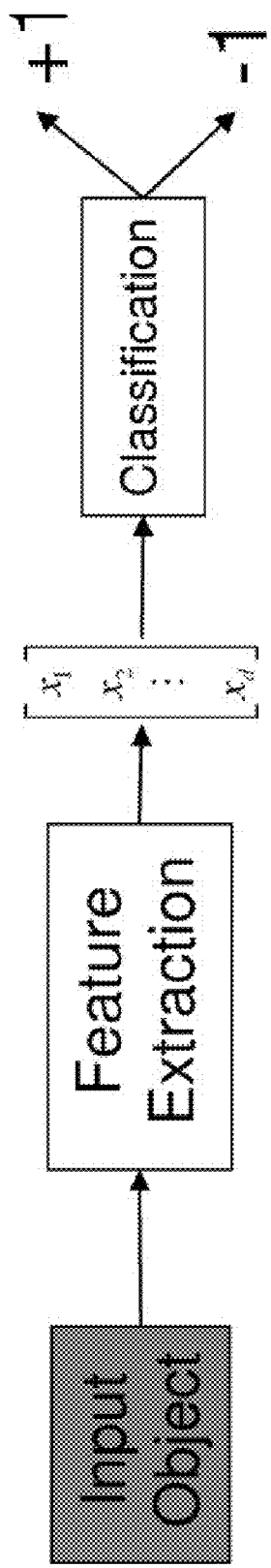
FIG. 4 shows a schematic of image feature extraction and classification.

Signal processing, or filtering, methods depart from the previous spatially-oriented paradigms by attempting to incorporate features from the frequency domain of the textural image. These methods generally follow the same two basic steps. First, a filter is applied to the original image to produce a frequency-domain representation of the image. Then the energies across the frequency subbands are calculated and used to represent the texture of the image. FIG. 4 illustrates this general process. Trygve Randen and John Hakon Husoy. Filtering for texture classification: a comparative study. IEEE Transactions on Pattern Analysis and Machine Intelligence, 21(4):291-309, April 1999.

Randen and Husoy present a thorough overview and comparison of various signal processing approaches. Trygve Randen and John Hakon Husoy. Filtering for texture classification: a comparative study. IEEE Transactions on Pattern Analysis and Machine Intelligence, 21(4):291-309, April 1999. The classic approach to extracting frequency information from a signal is via the Fourier transform. The Discrete Fourier Transform (DFT) of an $N_x \times N_y$ image I is defined as, $$F_I(p, q) = \sum_{x=1}^{N_x} \sum_{y=1}^{N_y} I(x, y) e^{-j(2\pi/N_x)px} e^{-j(2\pi/N_y)qy} \qquad (2.6)$$

for $p=1, 2, \ldots, N_x$ and $q=1, 2, \ldots, N_y$ where j is the imaginary number square root of −1. The Fourier coefficients $F_I(p, q)$, or some energy measures extracted from them can then be used as textural features.

The main drawback of the Fourier approach is that the resulting frequency information reflects global characteristics of the image. Mihran Tuceryan and Anil K. Jain. Texture analysis. In C. H. Chen, L. F. Pau, and P. S. P. Wang, editors, Handbook of Pattern Recognition & Computer Vision, volume 2, pages 207-248. World Scientific, Singapore, 1999. We note this by observing that the summations in Equation 2.6 are taken over the entire image, thus blurring any spatial variation of the texture. So while we gain frequency information by applying the DFT, we lose spatial information. It would be useful if we could obtain both frequency and spatial information.

One means of retaining spatial information in the frequency domain is to use the window Fourier transform (WFT), also called the short-time Fourier transform. This method isolates a portion of the original signal and performs a Fourier transform on that spatially isolated window. By repeating this process over various windows across the entire signal, the method extracts frequency information from the Fourier analysis and maintains spatial information due to the windowing. The width of the window determines the spatial resolution of the analysis. For a one-dimensional signal f(x), this window Fourier transform is (Mihran Tuceryan and Anil K. Jain. Texture analysis. In C. H. Chen, L. F. Pau, and P. S. P. Wang, editors, Handbook of Pattern Recognition & Computer Vision, volume 2, pages 207-248. World Scientific, Singapore, 1999)

$$F_\omega(u, \xi) = \int_{-\infty}^{\infty} f(x) \omega(x-\xi) e^{-j2\pi u x} dx \qquad (2.7)$$

where u and $\xi$ represent the frequency and spatial components of the transformed signal $F_w(u, \xi)$. Equation 2.7 becomes the Gabor transform when the window function w(.) is Gaussian. Mihran Tuceryan and Anil K. Jain. Texture analysis. In C. H. Chen, L. F. Pau, and P. S. P. Wang, editors, Handbook of Pattern Recognition & Computer Vision, volume 2, pages 207-248. World Scientific, Singapore, 1999. Applying similar ideas to a two-dimensional image yields the two-dimensional Gabor filter method. For example, the impulse response of an even-symmetric (i.e., real part only) two-dimensional Gabor filter with a 0° orientation to the horizontal axis is (Anil K. Jain and Farshid Farrokhnia. Unsupervised texture segmentation using Gabor filters. Pattern Recognition, 24(12):1167-1186, 1991), $$h(x, y) = \exp\left\{-\frac{1}{2}\left[\frac{x^2}{\sigma_x^2} + \frac{y^2}{\sigma^2}\right]\right\} \cos(2\pi u_0 x) \qquad (2.8)$$

where $u_0$ is the frequency along the horizontal axis and $\sigma_x$, and $\sigma_y$ govern the Gaussian envelope (window) that modulates the frequency sinusoid. Different orientations can be analyzed via axis rotation of the x and y coordinates. Anil K. Jain and Farshid Farrokhnia. Unsupervised texture segmentation using Gabor filters. Pattern Recognition, 24(12):1167-1186, 1991.

Gabor filters have enjoyed much attention and success in the texture classification field. Alan C. Bovick, Marianna Clark, and Wilson S. Geisler. Multichannel texture analysis using localized spatial filters. IEEE Transactions on Pattern Analysis and Machine Intelligence, 12(1):55-73, January 1990.

Anil K. Jain and Farshid Farrokhnia. Unsupervised texture segmentation using Gabor filters. Pattern Recognition, 24(12):1167-1186, 1991. W. Y. Ma and B. S. Manjunath. A comparison of wavelet transform features for texture image annotation. In Second International Conference on Image Processing, ICIP 95, volume 2, pages 256-259, October 1995. For instance, Jain and Farrokhnia report good performance of the Gabor filter for the task of unsupervised texture segmentation. They extract textural features for each pixel s by first passing an image through Gabor filters with various orientations and frequencies. They then pass the filtered images through a nonlinearity function and calculate an energy measure-based on the mean absolute deviation-about a local window centered around s, yielding the textural features for the pixels. Anil K. Jain and Farshid Farrokhnia. Unsupervised texture segmentation using Gabor filters. Pattern Recognition, 24(12):1167-1186, 1991.

While quite successful in practice, the Gabor filter has an important drawback. Once a specific window with a specific width is chosen, that window is applied across the entire signal. The result is a single resolution analysis of the image. A multi-resolution analysis, where the image is analyzed over windows of varying widths, would provide a more detailed and accurate analysis of the signal. This is precisely what the wavelet transform achieves. The window Fourier transform uses a fixed window width for all frequencies in the image. However, in the wavelet approach, higher frequency regions are analyzed over smaller windows in order to more accurately localize these fast-changing regions. Conversely, larger windows are needed to adequately capture information in the slowly-varying lower frequency regions.

In addition to the methods discussed above, in a preferred embodiment the method employs wavelet analysis which captures both the frequency and spatial content of image texture in a multi-resolution framework.

Texture Analysis Utilizing Wavelet Energy Features

Thus, in one aspect, the systems and methods described herein employ wavelet analysis for texture analysis. A thorough treatment of this topic is found in the text by Strang and Nguyen. Gilbert Strang and Truong Nguyen. Wavelets and Filter Banks. Wellesley-Cambridge Press, Wellesley, Mass., 1997.

The n-level two-dimensional discrete wavelet transform (DWT) iteratively extracts low and high frequency information from an image. At the first level, it decomposes the original image I into one set of approximation coefficients, denoted $cA_1$, and three sets of detail coefficients, denoted $cD_1^{(h)}$, $cD_1^{(v)}$ and $cD_1^{(d)}$, where h, v and d refer to the horizontal, vertical and diagonal directions, respectively. At the next iteration, the first-level approximation output, $cA_1$, is further decomposed into its approximation and detail coefficients $cA_2$, $cD_2^{(h)}$, $cD_2^{(v)}$ and $cD_2^{(d)}$. The process continues to the nth level of decomposition, forming a wavelet pyramid structure. Michel Misiti, Yves Misiti, Georges Oppenheim, and Jean-Michel Poggi. Wavelet Toolbox User's Guide. The Math Works, Inc., Natick, Mass., 1996.

We note that the approximation coefficients result from the application of two low-pass filters. Thus, the approximation coefficients hold low frequency information, and we can alternatively denote $cA_j$ as $LL_j$. Similarly, the detail coefficients result from the use of either one high-pass and one low-pass filter or two high-pass filters. Thus, they hold the high frequency information, and we can denote $cD_j^{(h)}$, $cD_j^{(v)}$ and $cD_j^{(d)}$ as $LH_j$, $HL_j$ and $HH_j$, respectively. Gert Van de Wouwer. Wavelets for Multiscale Texture Analysis. PhD thesis, University of Antwerp, 1998. While the standard wavelet pyramid method only decomposes the approximation, or LL coefficients, it is also possible to iteratively decompose the detail coefficients as well. The resulting decomposition is called the wavelet packet structure.

Each set of coefficients of an n-level wavelet decomposition represents an image subband. When using the wavelet coefficients to characterize texture, it is common practice to disregard the $cA_n$, or $LL_n$, subband as most interesting textural information has been lost due to the iterative low-pass filtering at that subband. G. Van de Wouwer, P. Scheunders, and D. Van Dyck. Statistical texture characterization from discrete wavelet representation. IEEE Transactions on Image Processing, 8(4):592-598, April 1999. Thus, an n-level wavelet pyramid decomposition will yield a coefficient set for 3n=B subbands, and we denote the bth subband coefficient set as cD[b] for b=1, 2, . . . , B.

Along with the decomposition level, the type of wavelet used in the decomposition will affect the resulting wavelet coefficients, and hence the resulting classification performance. Common wavelets and wavelet families include the Haar, Daubechies, Biorthogonal, Coiflets, Symlets, Morlet, Mexican Hat and Meyer wavelets. Michel Misiti, Yves Misiti, Georges Oppenheim, and Jean-Michel Poggi. Wavelet Toolbox User's Guide. The Math Works, Inc., Natick, Mass., 1996. In one implementation of the invention, the Daubechies 4 wavelet is used.

After filtering the textural image and extracting the wavelet coefficients at each subband, features are created that actually represent the texture. Laws first suggested that energy measures of the filtered image should be used as these textural features. K. I. Laws. Rapid texture identification. In Proc. SPIE Image Processing for Missile Guidance, volume 238, pages 376-380, 1980. If we have $N_b$ wavelet coefficients at subband b, for b=1, 2, . . . , B, then the energy at that subband is defined as (G. Van de Wouwer, P. Scheunders, and D. Van Dyck. Statistical texture characterization from discrete wavelet representation. IEEE Transactions on Image Processing, 8(4):592-598, April 1999), $$E_b = \frac{1}{N_b} \sum_{i=1}^{N_b} (cD[b]_i)^2 \quad (2.9)$$

where $cD[b]_i$ is the ith wavelet coefficient at the bth subband.

In stem cell applications, the highly-related variance of the wavelet coefficients is used at each subband as the energy measure, $$E_b = \frac{1}{N_b} \sum_{i=1}^{N_b} (cD[b]_i - \mu_b)^2 \quad (2.10)$$

where $$\mu_b = \frac{1}{N_b} \sum_{i=1}^{N_b} cD[b]_i \quad (2.11)$$

is the mean value of the coefficients at the both subband. Similarly, the mean deviation, or absolute mean, is defined as (G. Van de Wouwer, P. Scheunders, and D. Van Dyck. Statistical texture characterization from discrete wavelet representation. IEEE Transactions on Image Processing, 8(4):592-598, April 1999), $$MD_b = \frac{1}{N_b} \sum_{i=1}^{N_b} |cD[b]_i| \quad (2.12)$$

Applying Equations 2.10 and 2.12 across all B subbands in the wavelet decomposition of an image yields the wavelet energy signature of that image. Thus, the vector, $$x=[E_1, E_2, \ldots, E_B, MD_1, MD_2, \ldots, MD_B] \quad (2.13)$$

is the resulting wavelet energy textural feature representation.

Wavelet energy features from the standard wavelet pyramid structure have been applied successfully by many researchers. Smith and Chang used this approach for the task of image classification and achieve a success rate of 92.14%. J. R. Smith and S. F. Chang. Transform features for texture classification and discrimination in large image databases. In Proc. IEEE International Conference on Image Processing (ICIP-9/j), Austin, Tex., November 1994. Kociolek et. al. also performed image classification with wavelet energies with a high success rate. M. Kociolek, A. Materka, M. Strzelecki, and P. Szczypinski. Discrete wavelet transform-derived features for digital image texture analysis. In Proc. International Conference on Signals and Electronic Systems, pages 163-168, Lodz, Poland, September 2001.

Laine and Fan showed that wavelet energy features from the wavelet packet structure could be useful for texture classification. Andrew Laine and Jian Fan. Texture classification by wavelet packet signatures. IEEE Transactions on Pattern Analysis and Machine Intelligence, 15(11):1186-1191, November 1993. Chang and Kuo also used energies in the wavelet packet structure and report that the use of the packet structure as opposed to the standard pyramid structure is better suited for textures with energies concentrated in the lower frequencies. Tianhorng Change and C. C. Jay Kuo. Texture analysis and classification with treestructured wavelet transform. IEEE Transactions on Image Processing, 2(4): 429-441, October 1993. Ma and Manjunath compared the use of energy features between the wavelet packet and pyramid structures. W. Y. Ma and B. S. Manjunath. A comparison of wavelet transform features for texture image annotation. In Second International Conference on Image Processing, ICIP 95, volume 2, pages 256-259, October 1995. They concluded that the wavelet pyramid structure performs just as well as the wavelet packet structure and does so with a smaller feature vector yielding a lower computational complexity.

Moving beyond the strict use of wavelet energies, Wouwer et al. explored a rich set of wavelet histogram features. G. Van de Wouwer, P. Scheunders, and D. Van Dyck. Statistical texture characterization from discrete wavelet representation. IEEE Transactions on Image Processing, 8(4):592-598, April 1999. Vetterli and Do then estimated a probabilistic distribution on the actual wavelet coefficients for the task of content-based image retrieval. Minh N. Do and Martin Vetterli. Wavelet-based texture retrieval using generalized Gaussian density and Kullback-Leibler distance. IEEE Transactions on Image Processing, 11(2):146-158, February 2002.

In one preferred embodiment for textural feature representation using wavelet analysis, energy measurements were employed from the standard wavelet pyramid structure. However, other implementations may include the use of other methods of texture analysis (e.g., wavelet decomposition, dialate and erode, co-occurrence matrices, Fourier spectral analysis, Gabor methods, wavelet packet decomposition, statistical analysis of wavelet coefficients, Markov Random fields, autoregression models, spatial domain filters, Fourier and Wavelet domain filters, and texture segmentation).

Classification Module

For one embodiment, the classification module uses texture and/or border features that are extracted from the image analysis module to classify images of the cellular structure. In the case of cellular structures that are stem cells, stem cells may be classifed as [totipotent], pluripoten or as a or mature differentiated cell. The classification module includes a training module and a classification method.

In one aspect, a training model may be used to minimize errors in the classification module. This training module includes data such as image features of known cellular structures. In the case of stem cell analysis, a training module may be applied to stem cells that are known to be undifferentiated or mature. One particular classification model that may be used is a support vector machine, although other implementations may include the application of models such as Bayes classifiers, discriminant analysis, Parzen windows, multiple hypothesis testing, neural networks, k-nearest neighbors, decision trees, hierarchical clustering, fuzzy methods, and component analysis.

As is known in the art, classification methods can be partitioned into two groups based on the risk minimization principle employed. Classifiers that implement the empirical risk minimization (ERM) principle minimize errors on the training set. Classifiers implement the structural risk minimization (SRM) principle to minimize both training error and generalization error. In a preferred embodiment, the SRM principle is employed. Other ERM-based classification methods that may be used are described below.

Common Non-Parametric Classification Methods

Figure 5:
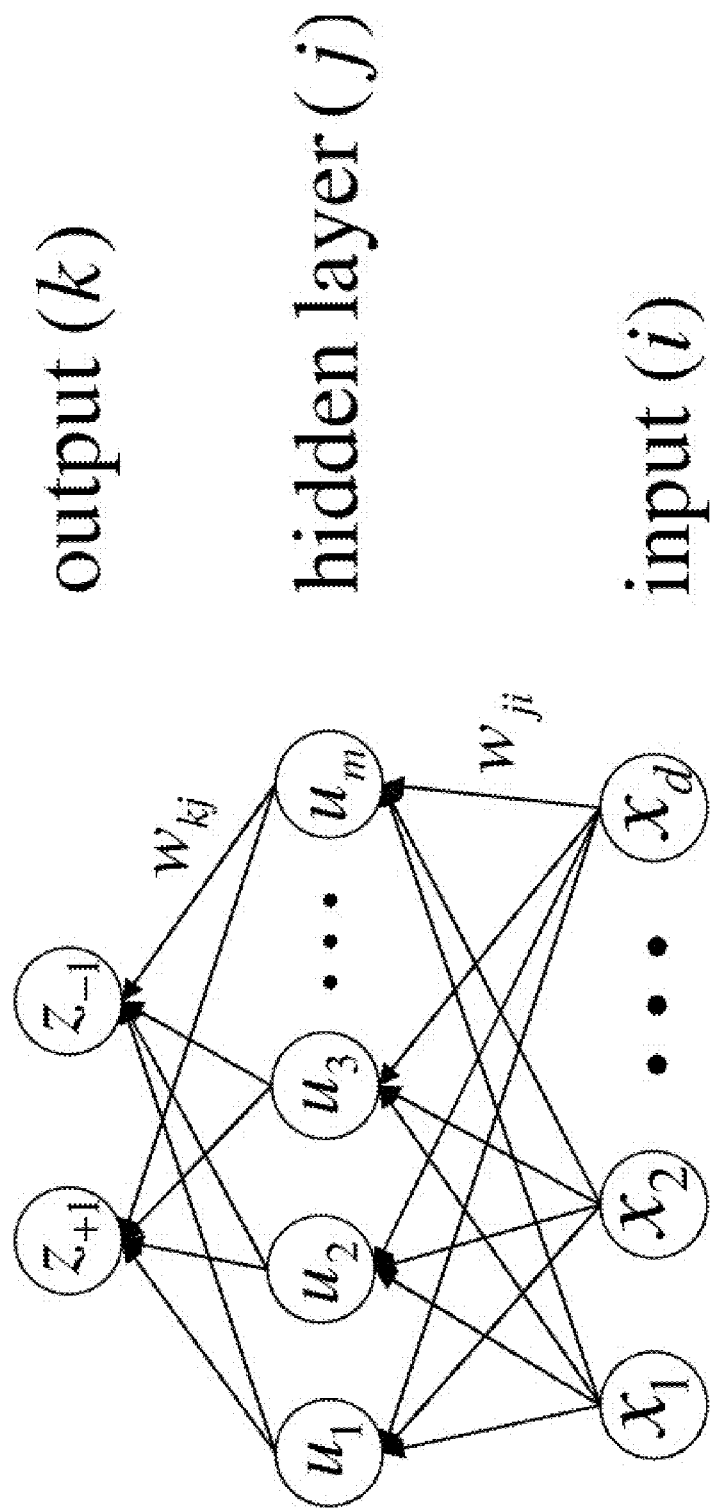
FIG. 5 shows an illustration of the basic neural network architecture. Displayed are the input, output, and hidden layer.

Exemplary ERM-based classification methods include neural networks and k-nearest neighbor. The basic neural network architecture is shown in FIG. 5. Peter E. Hart, Richard O. Duda, and David G. Stork. Pattern Classification. John Wiley & Sons, Inc., New York, Second edition, 2001. The input to the network is a d-dimensional feature representation. The two outputs represent the two classes of the binary classification problem. The wrinkle in the network is the presence of the m nodes of the hidden layer. The hidden layer allows for interactions among the input features in a manner similar to the basis function expansion found in regression. While the neural network in the figure contains only one hidden layer, it is possible to design networks with multiple hidden layers. In the figure, $w_{ji}$ represents the weight assigned to the arc from input feature i to hidden layer node j. Similarly, $w_{kj}$ represents the weight of the arc from hidden layer node j to output class k. Not shown in the figure, but essential to the neural network classifier, are nonlinear activation functions that govern the interaction between the inputs, the hidden layer and the outputs. Peter E. Hart, Richard O. Duda, and David G. Stork. Pattern Classification. John Wiley & Sons, Inc., New York, Second edition, 2001.

Thus, in a neural network, the output classification is related to the input point via the hidden layers and the specified activation functions. Training a neural network involves using training data to estimate the arc weights and the form of the activation functions. The so-called backpropagation algorithm is the standard method of training Peter E. Hart, Richard O. Duda, and David G. Stork. Pattern Classification. John Wiley & Sons, Inc., New York, Second edition, 2001. Further details on neural networks can be found in the literature. Peter E. Hart, Richard O. Duda, and David G. Stork. Pattern Classification. John Wiley & Sons, Inc., New York, Second edition, 2001. T. Hastie, R. Tibshirani, and J. Friedman. The Elements of Statistical Learning: Data Mining, Inference, and Prediction. Springer, New York, 2001.

Advantages of the neural network classifier include its ability to learn the form of the nonlinear activation functions from the training data, the flexibility of the hidden layer architecture to model many complex problems and its strong empirical performance in many applications. Peter E. Hart, Richard O. Duda, and David G. Stork. Pattern Classification. John Wiley & Sons, Inc., New York, Second edition, 2001. As is apparent to the skilled artisan, the main difficulty of the method involves regularization, or controlling the complexity of the classifier. If the model contains too many hidden layers or too many nodes within each layer, it will be overly complex and tend to overfit the training data at the expense of generalization performance. Peter E. Hart, Richard O. Duda, and David G. Stork. Pattern Classification. John Wiley & Sons, Inc., New York, Second edition, 2001.

The k-nearest neighbor algorithm is a simpler classifier than the neural network; it has only one parameter that needs to be specified, namely k, and has no explicit training step. Given a test point x, the algorithm finds the k nearest training points to the test point. The test point is then assigned the label of the class most represented by those k nearest neighbors. The Euclidean metric is a standard choice for defining the distance between the test and training points. Peter E. Hart, Richard O. Duda, and David G. Stork. Pattern Classification. John Wiley & Sons, Inc., New York, Second edition, 2001.

The k-nearest neighbor classifier is also easy to implement.

The Support Vector Machine

In addition to the ERM-based classification methods discussed above, the SRM-based support vector machines are a preferred embodiment of the systems and methods described herein.

Theoretical Basis for the SVM

Implementing the SRM principle involved minimizes not only the empirical error but also the generalization error. It can be shown that for a classifier f, parameterized by $\alpha$, for some $\lfloor, 0 \ldots \lfloor \ldots 1$, the following bound on generalization error holds. C. Burges. A tutorial on support vector machines for pattern recognition. Data Mining and Knowledge Discovery, 2(2):121-167, 1998:

$$R(\alpha) \leq R_{emp}(\alpha) + \sqrt{\left(\frac{v(\log(2N/v) + 1 - \log(\eta/4))}{N}\right)}, \quad (2.14)$$

with probability $1 - \eta$

In Equation 2.14, $R(\alpha)$ is the generalization error, $R_{emp}(\alpha)$ is the empirical error based on a training set of N data points and $\lfloor$ is the Vapnik Chervonenkis dimension (VC-dimension) of the family of classifiers F that contains f. The VC-dimension is a measure of the complexity of the family of classifiers F, and thus of the specific classifier f. The generalization error is bounded by the sum of the empirical error and a complexity term. Thus minimizing both the empirical error and VC-dimension of the family of classifiers allows one to generalize well.

We have one step remaining to tie the support vector machine to the SRM principle. Consider N data points from two classes that are constrained to lie within a hypersphere of radius $\phi$. Vladimir Vapnik showed that a certain type of classifier, namely maximally separating hyperplanes, applied to this set of data points has a VC-dimension bounded as (Vladimir N. Vapnik. The Nature of Statistical Learning Theory.

Springer-Verlag, New York, Second edition, 2000), $$v \leq \min\left(\frac{\varphi^2}{\Delta}, N\right) + 1 \quad (2.15)$$

where $\Delta$ is a measure of the separation achieved between the two classes. Maximizing this separation measure $\Delta$ can yield a smaller VC-dimension, which in turn yields a tighter upper bound on the generalization error. The support vector machine creates just such a maximally separating hyperplane.

SVM Formulation

Figure 6:
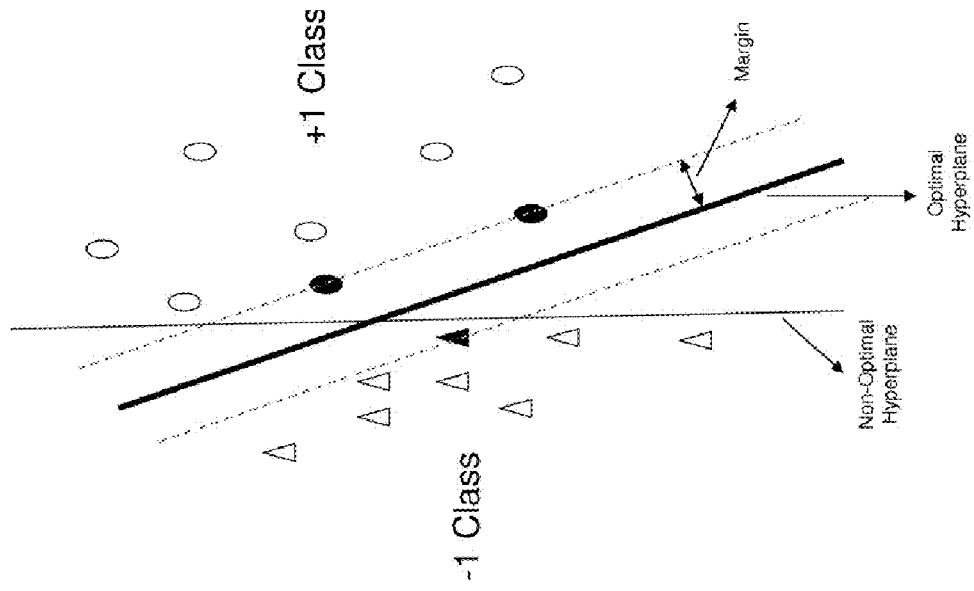
FIG. 6 shows a graph which illustrates the concept of maximizing margin in $\Re^2(d=2)$.

To derive the formulation of the SVM, consider two sets of training data points, each point described by its d-dimensional input vector, with the points distributed among the +1 and −1 classes. Support vector machines creating a maximally separating hyperplane by separating the two classes with a d-dimensional hyperplane w·x+b=0 where w ∈ $\Re^d$, b ∈ $\Re$. If a set of points can be separated without error by such a hyperplane, the set is termed linearly separable. Generally many different hyperplanes will separate a linearly separable set of training data and achieve zero empirical error. The ERM principle would not distinguish among such hyperplanes. However, the SRM principle defines the optimal, or maximally separating hyperplane as the one that maximizes margin where the margin is defined as the distance from the nearest point of either class to the hyperplane. FIG. 6 illustrates this concept of maximizing margin in $\Re^2$(d=2). By finding a hyperplane that achieves both zero empirical error and a large separation between classes, we expect to have low generalization error according to the SRM principle.

The SRM bounds in Equations 2.14 and 2.15 are generally not tight for a given implementation of the SVM. Despite this, the concept of simultaneously achieving low empirical error and maximizing margin as implemented by the SVM has a strong foundation in the SRM principle and represents a significant improvement over methods that simply minimize empirical error.

In practice, the support vector machine finds the maximally separating hyperplane by solving a quadratic optimization problem. First, let yi=1 for all points xi in class +1 and yi=−1 for all points xi in class −1. Assuming that the training data is indeed linearly separable, we define a hyperplane by the pair (w, b) such that (Edgar Osuna. Support Vector Machines: Training and Applications. PhD thesis, Massachusetts Institute of Technology, 1998), $$w \cdot x_i \geq 1 \ \forall \ i \text{ is such that } y_i = +1 \quad (2.16)$$

$$w \cdot x_i \leq -1 \ \forall \ i \text{ is such that } y_i = -1 \quad (2.17)$$

where w ∈ $\Re^d$, b ∈ $\Re$ is a scalar bias term. We can write the above expressions more compactly as (Edgar Osuna. Support Vector Machines: Training and Applications. PhD thesis, Massachusetts Institute of Technology, 1998), $$y_i(w \cdot x_i + b) \geq 1 \ \forall i = 1, 2, \ldots, N \quad (2.18)$$

This expression represents the constraint that all training points must be correctly classified by the hyperplane.

The distance from a point xi to the hyperplane is $$\frac{w \cdot x_i + b}{\|w\|}.$$

If we impose the normalization $\min_{i=1 \ldots N} |w \cdot x_i + b| = 1$, the distance from the hyperplane to the nearest point of either class, or the margin, is simply $$\frac{1}{\|w\|}.$$

In order to maximize this margin while ensuring that all points are correctly classified according to Equation 2.18, the following optimization problem (Edgar Osuna. Support Vector Machines: Training and Applications. PhD thesis, Massachusetts Institute of Technology, 1998):

$$\text{maximize}_{w,b} \frac{1}{\|w\|}$$

$$\text{s.t. } y_i(w \cdot x_i + b) \geq 1 \ \forall \ i = 1, 2 \ldots, N$$

Noting that maximizing ||w|| is equivalent to minimizing ½||w||², we have the following equivalent quadratic optimization formulation (Edgar Osuna. Support Vector Machines: Training and Applications. PhD thesis, Massachusetts Institute of Technology, 1998):

$$\text{minimize}_{w,b} \frac{1}{2}\|w\|^2$$

$$\text{s.t. } y_i(w \cdot x_i + b) \geq 1 \ \forall \ i = 1, 2 \ldots, N$$

Solving this problem returns the optimal pair (w, b) from which the classification functions h(x)=w·x+b and f(x)=sign (w·x+b) are created for a new data point x. Edgar Osuna. Support Vector Machines: Training and Applications. PhD thesis, Massachusetts Institute of Technology, 1998. The formulation above is the linear primal formulation and is generally useful for data that is linearly separable in its original d-dimensional space. Using the duality theory, an equivalent linear dual formulation may be found that is easier to solve than the primal. Furthermore, by allowing some training points to be misclassified (violating Equation 2.18), the soft margin primal formulation and soft margin dual formulation may be created. Finally, projecting the data into a higher-dimensional space provides a flexible and powerful SVM formulations: the nonlinear soft margin dual formulation.

SVM Features and Terminology

As mentioned above, a preferred SVM formulation is the nonlinear soft margin dual formulation. This formulation serves as a useful vehicle for discussing the terminology and features of the support vector machine as used herein. It is formulated as (C. Burges. A tutorial on support vector machines for pattern recognition. Data Mining and Knowledge Discovery, 2(2):121-167, 1998), $$\text{maximize}_{\{\lambda_1,\lambda_2,\ldots,\lambda_N\}} \sum_{i=1}^{N} \lambda_i - \frac{1}{2} \sum_{i=1}^{N} \sum_{j=1}^{N} \lambda_i \lambda_j y_i y_j K(x_i, x_j) \quad (2.19)$$

$$\text{s.t. } \sum_{i=1}^{N} \lambda_i y_i = 0 \quad (2.20)$$

$$\lambda_i \leq C \quad \forall \ i = 1, 2, \ldots, N \quad (2.21)$$

$$\lambda_i \geq 0 \quad \forall \ i = 1, 2, \ldots, N \quad (2.22)$$

where $\lambda_i$ is the Lagrange multiplier associated with the training point $x_i$, K(., .) is a kernel function and C is a cost penalty. Solving this quadratic optimization problem returns the $\lambda_i$ values that defines the maximally separating hyperplane.

The optimization problem above scales with the the number of data points N rather than the dimensionality d of the input points. Thus, support vector machines, handle data with high-dimensional feature vectors.

Furthermore, the ith Lagrange multiplier $\lambda_i$ tells us how influential the ith training point is in defining the separating hyperplane. If $\lambda_i=0$, then the input point xi has no influence in characterizing the hyperplane, and we can disregard such points without consequence. Conversely, those points xi for which $\lambda_i>0$ are called support vectors. The set $S=\{x_i:\lambda_i>0\}$ is defined as the support vector set. The separating hyperplane is fully characterized by only those points in S. The cardinality of S is generally less (and never more) than the number of input points N; thus, the SVM actually scales with only a subset of the original input points.

The kernel function $K(x_i, \ldots x_j)$ is a function in the original d-dimensional input space that calculates the inner product of the two input vectors $x_i$ and $x_j$ in some higherdimensional feature space. The use of the kernel function allows us to find the optimal hyperplane in the high-dimensional feature space and map that hyperplane back into the original input space as a non-linear separator. Two common kernel functions are the polynomial kernel of degree p, $$K(x_i, x_j) = (x_i \cdot x_j + 1)^p \qquad (2.23)$$

and the radial basis function kernel with width σ, $$K(x_i, x_j) = e^{-\|x_i-x_j\|^2/2\sigma^2} \qquad (2.24)$$

Finally, the cost penalty C controls the tradeoff between empirical error and margin. A large C will sacrifice some margin width for better empirical performance (less misclassified training points), while a small C will attempt to create a larger margin at the expense of more misclassified training points.

Once we have solved for the optimal multipliers $\{\lambda, \lambda_2, \ldots, \lambda_N\}$ we can create the classification functions h(x) and f(x) for a new input point x as (C. Burges. A tutorial on support vector machines for pattern recognition. Data Mining and Knowledge Discovery, 2(2):121-167, 1998), $$h(x) = \sum_{i \in S} \lambda_i y_i K(x_i, x) + b \qquad (2.25)$$

$$f(x) = \text{sign}\left(\sum_{i \in S} \lambda_i y_i K(x_i, x) + b\right) \qquad (2.26)$$

$$b = y_i - \sum_{j=1}^{N} y_i \lambda_j K(x_j, x_i), \text{ for } i \text{ such that } x_i \in S \qquad (2.27)$$

Geometrically, h(x) returns the signed Euclidean distance from the test point x to the optimal hyperplane, and f(x) returns the binary +1 or −1 classification of x. We interpret h(x) as the confidence in the binary decision. Larger positive/negative values of h(x) show higher confidence in the corresponding +1/−1 decision.

SVM Performance

The most beneficial properties of SVM is that the SVM attempts to minimize not only empirical error but also the more appropriate generalization error by maximizing margin. Thus it may be preferred over methods such as the neural network and nearest neighbor classifiers that only minimize training error.

In addition, the SVM is naturally regularized in two senses. First, by adjusting the cost penalty C, the complexity can be controlled. A proper setting of C allows for the misclassification of some training points in exchange for a larger margin and better generalization performance. Secondly, Ryan Rifkin shows that the standard SVM formulation can actually be derived directly from the deep and well-known concepts of regularization theory. Ryan Rifkin. Everything Old is New Again: A Fresh Look at Historical Approaches in Machine Learning. PhD thesis, Massachusetts Institute of Technology, September 2002.

The concise and flexible formulation of the SVM as a quadratic optimization problem is also useful. SVM further allows one to work with either the primal or dual version of the problem. The convexity of both formulations guarantees a globally optimal solution. This convexity property, along with duality theory, also allows for the derivation of Edgar Osuna's active set algorithm, a fast solution method for the dual problem. Edgar Osuna. Support Vector Machines: Training and Applications. PhD thesis, Massachusetts Institute of Technology, 1998. The kernel function allows one to find a linear separator in a high dimensional feature space without actually mapping the input points into that space. Thus, while the resulting decision boundary may be highly nonlinear in the original space, its linearity in the feature space results in a concise classification function that is easily expressed in the original space.

As mentioned above, the size of the SVM scales with a generally small subset of the number of training points rather than with the dimensionality of the inputs. This allows the SVM to solve problems with high dimensional inputs.

Parametric Classification: The Kullback-Leibler Distance Classifier

As discussed above, the cellular classification model is considered in two separate and unrelated steps, feature representation and classification. Splitting up the machine learning tasks allows various available feature representations to be paired with the many classification algorithms to produce a vast amount of experimental work that can be performed. Given n feature representations for a problem and m classification methods, n−m different experiments can be run and analyzed to find the optimal pairing of feature representation and classification method for a given problem.

In another embodiment, the feature representation and the classification models may be combined. For example, if the data to be classified follows a certain probability distribution, the one would design a parametric classification method that takes that knowledge into account. This is precisely the goal of the Kullback-Leibler distance (KLD) classifier. This classifier is an adaptation of a method proposed by Martin Vetterli and Minh Do for the task of content-based image retrieval.

The Generalized Gaussian Distribution for Wavelet Coefficient Modelling

Vetterli and Do made the assumption that the wavelet coefficients at each subband extracted from a textural image follow a generalized Gaussian distribution (GGD), $$p(x; \alpha, \beta) = \frac{\beta}{2\alpha\Gamma(1/\beta)} e^{-(|x|/\alpha)^\beta} \qquad (2.28)$$

where $$\Gamma(z) = \int_0^\infty e^{-t} t^{z-1} dt \qquad (2.29)$$

is the Gamma function defined on z>0. The two GGD parameters α and β control the width and decreasing rate of the distribution's peak. The GGD reduces to the Laplacian and Gaussian distributions for $\beta=1$ and $\beta=2$, respectively. Minh N. Do and Martin Vetterli. Wavelet-based texture retrieval using generalized Gaussian density and Kullback-Leibler distance. IEEE Transactions on Image Processing, 11(2):146-158, February 2002. In fact, as $\beta \to \infty$, the GGD approaches the uniform distribution.

The applicability of the GGD for modelling wavelet coefficients has been demonstrated by showing that estimated GGD's fit well the actual wavelet coefficient histograms. G. Van de Wouwer, P. Scheunders, and D. Van Dyck. Statistical texture characterization from discrete wavelet representation. IEEE Transactions on Image Processing, 8(4):592-598, April 1999. Vetterli and Do justified this by performing texture synthesis using the estimated GGD's to generate synthesized sets of wavelet coefficients which are used to create an estimated textural image via the inverse wavelet transform. The visual similarity between the original and synthesized images demonstrates the accuracy of the GGD model of wavelet coefficients. Minh N. Do and Martin Vetterli. Wavelet-based texture retrieval using generalized Gaussian density and Kullback-Leibler distance. IEEE Transactions on Image Processing, 11(2):146-158, February 2002.

At each level of wavelet decomposition extracted three sets of coefficients, each representing a different subband. Thus, for an n-level decomposition, we have coefficients for 3n=B subbands. By modelling each set of coefficients as a GGD and estimating the two parameters for each ($a^b$ and $\beta^b$ b=1, 2, ..., B), 2B parameters can be extracted for each image.

The Kullback-Leibler Distance

After extracting the GGD parameters, Vetterli and Do turned to designing a classification method that took advantage of the parametric feature representation. They concluded that a test point should be classified to the class whose wavelet coefficient distribution is closest to the distribution of the test point as measured by the Kullback-Leibler distance metric. While Vetterli and Do used their KLD classification method for the task of imagewise classification, this adapted method may be for image segmentation as discussed below.

Let $p^b_k(x; a^b_k, \beta^b_k)$, k={+i, −1}, b=1, 2, ..., B, represent the GGD of the wavelet coefficients of the kth class at the bth subband. Let $p^b_t(x; a^b_t, \beta^b_t)$ be the corresponding GGD of a test point to be classified. Vetterli and Do showed that one should choose the class that satisfies the KLD decision rule (Minh N. Do and Martin Vetterli. Wavelet-based texture retrieval using generalized Gaussian density and Kullback-Leibler distance. IEEE Transactions on Image Processing, 11(2):146-158, February 2002), $$k_{opt} = \arg\min_{k \in \{+1,-1\}} D(p^b_t(x; \alpha^b_t, \beta^b_t) \| p^b_k(x; \alpha^b_k, \beta^b_k)) \quad (2.30)$$

where $$D(p^b_t(x; \alpha^b_t, \beta^b_t) \| p^b_k(x; \alpha^b_k, \beta^b_k)) = \quad (2.31)$$

$$\int p^b_t(x; \alpha^b_t, \beta^b_t) \log \frac{p^b_t(x; \alpha^b_t, \beta^b_t)}{p^b_k(x; \alpha^b_k, \beta^b_k)} dx$$

is the Kullback-Leibler distance operator at the both subband.

Vetterli and Do showed that for a GGD, Equation 2.31 can be simplified to the closed form expression (Minh N. Do and Martin Vetterli. Wavelet-based texture retrieval using generalized Gaussian density and Kullback-Leibler distance. IEEE Transactions on Image Processing, 11(2):146-158, February 2002), $$D(p^b_t(x; \alpha^b_t, \beta^b_t) \| p^b_k(x; \alpha^b_k, \beta^b_k)) = \quad (2.32)$$

$$\log\left(\frac{\beta^b_t \alpha^b_k \Gamma(1/\beta^b_k)}{\beta^b_k \alpha^b_t \Gamma(1/\beta^b_t)}\right) + \left(\frac{\alpha^b_t}{\alpha^b_k}\right)^{\beta^b_k} \frac{\Gamma((\beta^b_k+1)/\beta^b_t)}{\Gamma(1/\beta^b_t)} - \frac{1}{\beta^b_t}$$

From Equation 2.32, one can calculate the Kullback-Leibler distance between a test point and the kth class using only the estimated GGD parameters of the kth class and the test pixel.

Furthermore, under the assumption that the wavelet coefficient distributions are independent across the B subbands of the decomposed image, Vetterli and Do showed that Equation 2.30 expands to (Minh N. Do and Martin Vetterli. Wavelet-based texture retrieval using generalized Gaussian density and Kullback-Leibler distance. IEEE Transactions on Image Processing, 11(2):146-158, February 2002), $$k_{opt} = \arg\min_{k \in \{+1,-1\}} \sum_{b=1}^{B} D(p^b_t(x; \alpha^b_t, \beta^b_t) \| p^b_k(x; \alpha^b_k, \beta^b_k)) \quad (2.33)$$

That is, with the independence assumption, one can add sum up the KLD's across all subbands.

For notational consistency, the KLD decision rule of Equation 2.33 is posed in the manner of the SVM decision rules as described above. If x is some test point, then $$KLD(x, +1) = \sum_{b=1}^{B} D(p^b_t(x; \alpha^b_t, \beta^b_t) \| p^b_{+1}(x; \alpha^b_{+1}, \beta^b_{+1})) \quad (2.34)$$

and $$KLD(x, -1) = \sum_{b=1}^{B} D(p^b_t(x; \alpha^b_t, \beta^b_t) \| p^b_{-1}(x; \alpha^b_{-1}, \beta^b_{-1})) \quad (2.35)$$

are the Kullback-Leibler distances between the test points's wavelet coefficient distribution and the +1 and −1 classes' wavelet coefficient distributions, respectively. Then one can write Equation 2.33 as the KLD classification function, $$f(x) = \text{sign}(KLD(x, -1) - KLD(x, +1)) \quad (2.36)$$

Additionally, we introduce a KLD confidence measure, $$h(x) = KLD(x, -1) - KLD(x, +1) \quad (2.37)$$

Commercial Applications

Various embodiments of the invention are image-based and measure, for example, quality of adherent stem cells under conditions favorable for their growth. Additionally, the systems and methods of the invention are suitable for scale up for large quantities of stem cells that will be needed for therapy and research. They are also suited to evaluation of eggs and embryos where improving the outcome of egg and embryo development is of utmost importance in fertility clinics.

According to another feature, the invention uses the output of the classification and image processing, meaning the information extracted to develop models that explain the biology and medicine of stem cells and their products.

The hierarchical approach integrates all the known tools and information to yield a superior classification and characterization performance. This includes the fusion of information from images of different resolution and modalities, the incorporation of prior information, and the generation, selection and combining various features.

Other commercial applications include, without limitation, evaluation of the quality and suitability of cells in culture is important when they are used in biological experiments, when they are to be used in vitro fertilization, cell therapy or tissue engineering, or when cells are used as indicators or reporters of drug activity or detectors of environmental quality. Cells are routinely evaluated and selected by experts based on experience, but there is an increasing need for large scale, rapid, reproducible and quantitative evaluation of cells that is not possible by investigators. Several companies provide these capabilities to the pharmaceutical industry, hospitals and academic laboratories with the use of instrumentation that analyses molecular characteristics but that requires destroying a representative sample. A few providers of testing tools use non-invasive technologies such as measuring the components of spent culture media or by using physical or chemical probes, such as electrical, optical, or mechanical characteristics. A recent market segment uses optical methods to microscopically evaluate cells used for medical therapy drug screening or for evaluating large-scale quantitative biological experiments where the number or complexity of conditions exceeds the capabilities of manual investigation. Drug discovery is currently a multibillion-dollar market. The fields of tissue engineering and cell therapy are projected to have rapid growth and to become the major methodology of repairing injured or low functioning tissue and have applications in cancer therapy, and for maintaining the integrity of tissue after damage or degeneration. In all of these applications, the ability to evaluate cell quality and suitability is an under served need that promises to have major impact on the quality of patient care.

We have chosen invitro fertilization and stem cell therapy as example cases. In Vitro Fertilization is a 3 decades old use of cell therapy applied to patients with compromised fertility and it requires detailed evaluation of egg and embryo quality. Stem cell therapy was chosen because stem cells require high volume cell production in vitro for experimental determination of basic biological characteristics and for producing adequate numbers of cells for tissue engineering. The first therapeutic use of embryonic cells is likely to be in neurodegenerative diseases such as Parkinsons, Multiple Sclerosis, Lou Gherigs (ALS) disease, and possibly Alzheimer's disease. Many groups are working on producing neurons from hES cells and the work to date is very encouraging, showing success in mouse models to date with Parkinsons, Multiple Sclerosis and ALS. Diabetes is another very important target disease that hES cells may possibly treat by differentiating into beta islet cells that produce insulin. Another very critical target disease is cardiovascular disease. To date, hES have been used in animal models of heart disease. In culture, hES have been used to recreate intact blood vessels. All of these therapeutic applications require the routine evaluation of undifferentiated cells during scale up of raw material that can be used to produce the differentiated cell type desired for therapy. In both the propagation and expansion of undifferentiated stem cells, and in the controlled differentiation of stem cells to the selected cell fate needed for therapy, the routine evaluation of cells in a non-destructive way will promote the product quality demanded for FDA approval and for therapeutic-grade cells.

The first therapeutic use of embryonic cells is likely to be in neurodegenerative diseases such as Parkinsons, Multiple Sclerosis, Lou Gherigs (ALS) disease, and possibly Alzheimer's disease. Many groups are working on producing neurons from hES cells and the work to date is very encouraging, showing success in mouse models to date with Parkinsons, Multiple Sclerosis and ALS. Diabetes is another very important target disease that hES cells may possibly treat by differentiating into beta islet cells that produce insulin. Another very critical target disease is cardiovascular disease. To date, hES have been used in animal models of heart disease. In culture, hES have been used to recreate intact blood vessels. All of these therapeutic applications require the routine evaluation of undifferentiated cells during scale up of raw material that can be used to produce the differentiated cell type desired for therapy. In both the propagation and expansion of undifferentiated stem cells, and in the controlled differentiation of stem cells to the selected cell fate needed for therapy, the routine evaluation of cells in a non-destructive way will promote the product quality demanded for FDA approval and for therapeutic-grade cells.

In one application, this methodology is ideally suited for evaluating consistency and quality of eggs and embryos in fertilization clinics and research labs for the scale-up of stem cell production for therapeutic tissue engineering, and in screening campaigns where visible changes of cells can be used to detect changes to their environment in response to known or unknown added factors. Most current methods evaluate cells on the basis of molecular determinants and require killing samples or added potentially perturbing reporter molecules.

Additionally, this architecture can be used to develop and enhance the environmental conditions of stem cells, that can help predict stem cell growth, their maintenance, and the controlled production of specific differentiated cell lineages for therapeutic, investigational, screening or other medically beneficial purposes, or products of these cells including but not limited to proteins, nucleotides and carbohydrates that have therapeutic or investigational value.

Expanding the sensory component based on an integration of multiple inputs from imaging and other non-invasive techniques such as thermal, electrical or chemical sensing of media, gases or metabolites would produce a sensitive non-destructive and measure of cell conditions. The detection could be discrete, or combined over multiple dimensions including input variable, time and location. Kinetic measures could be expanded to real-time sensing of cell state for the purpose of monitoring or controlling cell state.

The sensing component of an illustrative embodiment of the invention may be interactive, for example, changing media, killing unwanted cells, protecting and passaging stem cells or differentiated lineages to fresh containers, collecting metabolites, secreted products or measuring reactants for desired biochemical outcomes. Such interaction may produce a fully integrated system based on specific sensory technologies The interactive potential of such a sensory-control circuit provides for adaptability, self-correction or user-guided changes for producing the desired outcomes for cells, their environment or their products. Sensing methods of the invention may, for example, be adapted to provide decision for altering cell state, and physical or chemical environment including chemical composition of the culture media, gas composition and concentration, or biological environment, including the addition of helper-cells or cell products for the benefit of the user. The ability to sense the condition of cells and their chemical and physical environment adds high value to the decisions on how to manipulate cells.

The benefits of producing an automated system for production of stem cells and their products is critical to overcoming a rate limiting step in cell therapy and tissue engineering, the reproducible, qualified production of stem cells and stem cell products that are difficult to produce manually in large quantities with required consistency from batch to batch and over time.

The invention now being generally described, it will be more readily understood by reference to the following examples which are included merely for purposes of illustration of certain aspects and embodiments of the present invention, and are not intended to limit the invention in any way.

Exemplifications

EXAMPLE 1

Stem Cell Application: Qualitative Interior Textural Segmentation

Now that we have laid the theoretical and practical foundations for the use of both the non-parametric support vector machine classifier with wavelet energy features and the parametric Kullback-Leibler distance classifier to characterize texture, we turn to creating a computer aid based on these methods for the characterization and categorization of stem cell colonies.

Research Contributions

The core step in the stem cell quality control process is the determination of each individual colony's health and viability. Only those colonies deemed sufficiently healthy are maintained in culture. Focusing on the visual characteristics of stem cell colony health, shows that there are three criteria of a good stem cell colony: textural homogeneity, textural tightness, and border sharpness and circularity Though the first two criteria are independent factors, together they define the textural characteristics of a good stem cell colony. Homogeneity refers to the uniformity of the textural qualities across the colony. This factor is important because heterogeneous areas of the colony may not be suitable for subculturing as these regions are showing signs of cellular differentiation. However, this criterion alone does not discriminate among the various types of uniform texture. For example, a colony could exhibit uniformly loose texture and still satisfy the homogeneity criterion. The second criterion of textural tightness dictates the specific type of texture that constitutes a good colony; namely, a good colony consists of small cells, densely packed together to reveal a tight texture. Jointly, these first two criteria state that a good stem cell colony exhibits a homogeneous tight texture throughout the colony.

The third criterion is based on the border characteristics of a stem cell colony. A good stem cell colony exhibits sharply defined, highly circular borders. Moving radially out from the centroid of a good colony should reveal a sharp gradient at the colony border, while traversing rotationally along the border should expose few inflection points or deviations from circularity.

FIG. 2 shows examples of a good and bad stem cell colony. Notice that the good colony exhibits a tight, homogeneous texture with a clear, generally circular border. In contrast, the bad colony has a rather heterogeneous textural interior consisting of very loose, broad cells. In addition, its border, while generally circular, is not sharp.

As discussed above, in one aspect the methods may use a two-tiered approach based both on the type of output produced by each tier and the specific visual colony quality criteria employed to create that output. Tier 1 focuses on the first two textural criteria and yields texture-based qualitative graphical aids aimed at reducing the time spent by stem cell researchers in visually examining their colonies. Tier 2 then combines the texture analysis from Tier 1 with its own border criterion analysis to provide standard quantitative measures of colony quality.

Figure 7:
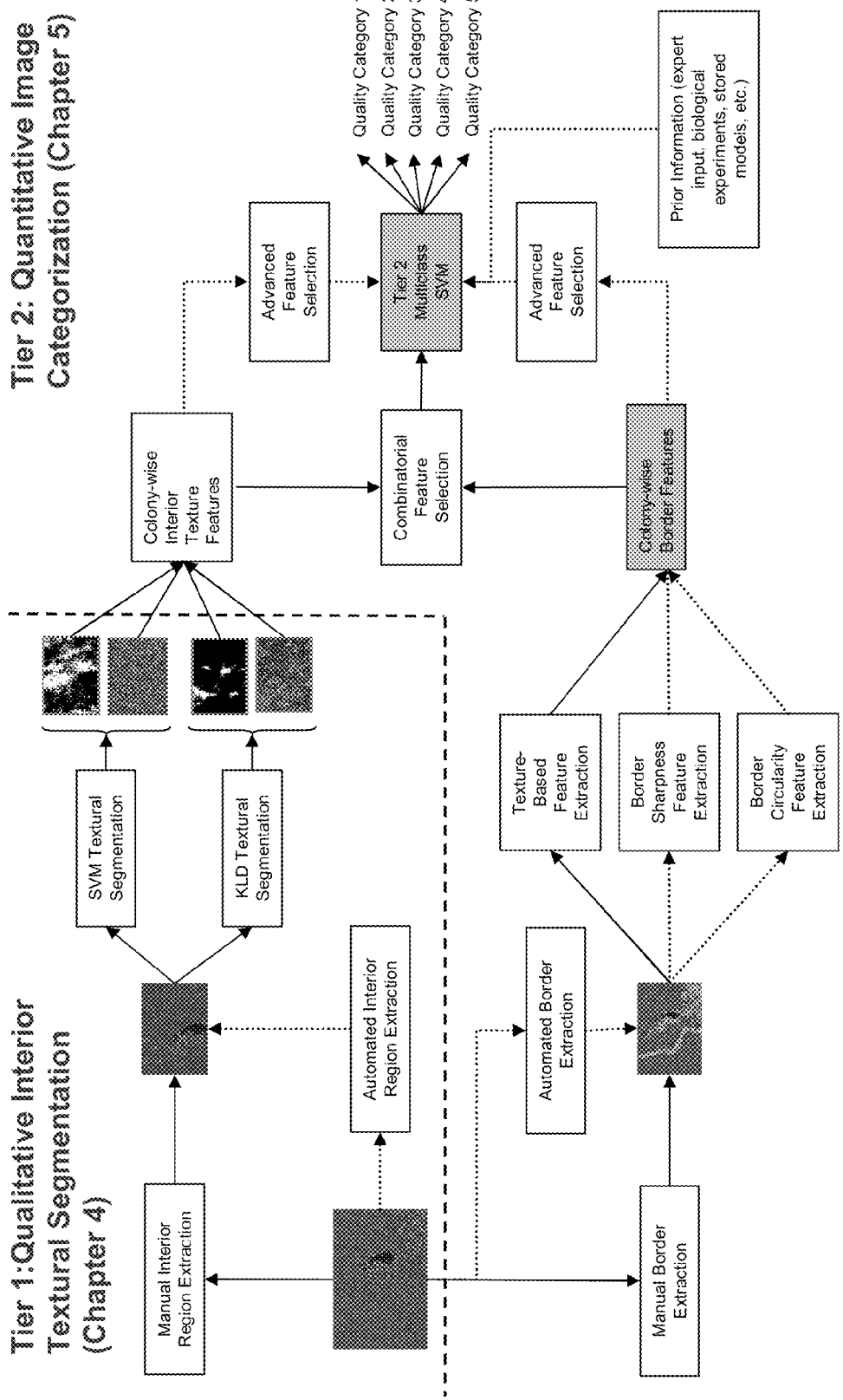
FIG. 7 shows a schematic of the architecture of a two-tiered hierarchical cellular structure paradigm. This two-tiered illustration shows the interaction between the qualitative Tier 1 and the quantitative Tier 2.

While Tier 1 focuses on the qualitative analysis of interior texture quality, Tier 2 uses interior textural quality features-derived from the graphical Tier 1 outputs and a new set of border quality features to categorize the entire stem cell colony in terms of its overall health and level of differentiation. This represents a hierarchical, two-tiered approach where the Tier 2 analysis uses and builds upon the Tier 1 outputs. FIG. 7 illustrates the architecture of this two-tiered method and shows the interaction between the two tiers.

Interior Textural Segmentation Methodology

In one aspect, we were provided 77 images of stem cell colonies of varying quality. The colonies were approved National Institutes of Health (NIH) human embryonic stem cells, line HSF-6 from the University of San Francisco. The images were acquired on a Nikon TMS inverted tissue culture microscope with a 10× phase contrast objective and a Nikon D100 digital camera. Each image is in RGB format of size 1000×1504 pixels. Each RGB image was convered to grayscale via the MATLAB function rgb2gray and scale the resulting 256 grayscale intensity levels to the interval $[-1\ 1]$ for computational stability.

Additionally, since the Tier 1 analysis performed textural segmentation strictly on the interior regions of the stem cell colonies, these interior regions must be extracted from each colony. This is done by identifying the largest inscribed rectangle lying clearly and fully within the colony interior. This rectangular subimage is defined as the interior region used in the Tier 1 analysis.

Training Data Extraction

The goal of the Tier 1 analysis is to segment each stem cell colony into healthy and poor regions based on the colony texture, therefore training data is needed for representing good and bad texture the SVM and KLD classification methods. This method must take into account the fact that there are two types of good texture and two types of bad texture.

Flat texture defined healthy regions of the colony where the individual stem cells are packed together so tightly as to be individually unrecognizable, giving the regions a flat appearance. The tight texture regions also signify healthy portions of the colony where individual cells are recognizable, yielding a tight textural quality.

The two types of bad texture are black texture and loose texture regions. Black texture regions occur when the individual stem cells pile up on top of each other and appear as a black splotch under the microscope and in the resulting images. The individual cells in the loose texture regions are not tightly packed together and are generally broad, giving the region its loose textural quality.

For stem cell applications, a standard training set representing each of the four types of texture defined above is created. These training sets are used for all the runs in the Tier 1 analysis. This method identifies four different colonies from among the 77 available colonies each containing sufficiently large regions (approximately 300×300 pixels) within them that exhibit flat texture; randomly extract 50 windows of size 55×55 from each of the four different regions identified in Step 1, yielding 50·4=200 windows of size 55×55 exhibiting flat texture; perform a wavelet decomposition on each of these 200 flat texture windows; for use with the SVM classifier, take the mean deviation and variance of the wavelet coefficients at each subband for each of the 200 wavelet decompositions. This yields a wavelet energy feature vector for each of the 200 flat texture windows that can be used to train the SVM classifier; for use with the KLD classifier, estimate the generalized Gaussian distribution parameters of the wavelet coefficients at each subband for each of the 200 wavelet decompositions. The yields a set of GGD parameters for each of the 200 flat texture windows that can be used to train the KLD classifier; define the flat texture training set to consist of these 200 wavelet energy feature vectors and GGD parameter sets; repeat steps using regions exhibiting tight texture, resulting in a tight texture training set consisting of 200 wavelet energy feature vectors and GGD parameter sets calculated from the tight texture regions; created a composite good texture training set by combining 100 random samples from the flat texture training set and 100 random samples from the tight texture training set; repeat, replacing the two types of good texture with the two types of bad texture, resulting in three bad texture training sets: black texture training set, loose texture training set and composite bad training set, each with 200 training points; repeat using windows of size 45×45 and 35×35 to create the various training sets for these two additional window sizes.

TABLE 4.1

Nine Tier 1 Training Sets

| Training Set Number | Paired Texture Types |
|---|---|
| 1 | flat texture + black texture |
| 2 | flat texture + loose texture |
| 3 | flat texture + composite bad |
| 4 | tight texture + black texture |
| 5 | tight texture + loose texture |
| 6 | tight texture + composite bad |
| 7 | composite good + black texture |
| 8 | composite good + loose texture |
| 9 | composite good + composite bad |

For a given window size, pairing each good texture training set with each bad texture training set yielded nine complete training set pairs.

SVM and KLD Algorithmic Settings

For the Tier 1 analysis, three window sizes 55×55, 45×45 and 35×35 were considered. Additionally, for the SVM method, we use a polynomial kernel of degree 3 and SVMi'9ht's default C value was used together with the Daubechies 4 wavelet with a 2-level decomposition.

The SVM and KLD methods are computationally expensive due to the wavelet decomposition, KLD parameter estimation and SVM classification steps. While the training algorithms performed these steps on 400 textural windows, train the SVM and KLD classifiers each time the test algorithms were run introduced unnecessary computations. However, with the nine training sets, the SVM and KLD classifiers can be trained once for each training set saving the parameters that define the trained classifier saved. Before each test run, one need load the saved classifiers instead of retraining.

In the SVM and KLD test algorithms, performing the wavelet decomposition, KLD parameter estimation and SVM classification steps on even a small subset-specifically, the extracted interior region-of the approximately 1.5 million pixels in the 1000×1504 pixel colony images is a significant computational expense. To speed up this classification process, every fifth pixel in both the vertical and horizontal directions of the interior regions were classified of each of the 77 images; the remaining pixels were assigned to the class of their nearest classified neighbor. This results in a lower-resolution reclassified image, but the computational speedup was significant.

To provide a rich set of qualitative outputs, one can perform a number of runs on each of the 77 colony images. These numerous Tier I runs yielded many interior textural quality features that can be used for the task of quantitative image categorization in the Tier 2 analysis.

For these runs, both the SVM and KLD methods were employed to test-or, more accurately, reclassify-each of the 77 preprocessed stem cell colony images using each of the nine training sets with each of the three window sizes. This results in 2·9·3=54 analyzes for each of the 77 colonies. However, some of the 77 colonies have contributed training data toward the creation of the nine training sets described in Example 1. In order to keep the training and test data separate, the analysis disregarded of any colony where a training set containing data contributed by that colony is employed.

Each analysis calculated a binary classification $f(x_i)$ and confidence value $h(x_i)$ for each pixel $x_i$ in the stem cell colony image being reclassified. A graphical output was created as shown below using the values calculated across the colony images.

Reclassified Image Outputs

The SVM and KLD binary classifications and confidence values calculated across each stem cell colony image allowed production of various graphical outputs that can assist stem cell researchers in determining the health of their colonies. Four types of graphical outputs are described below.

Figure 8:
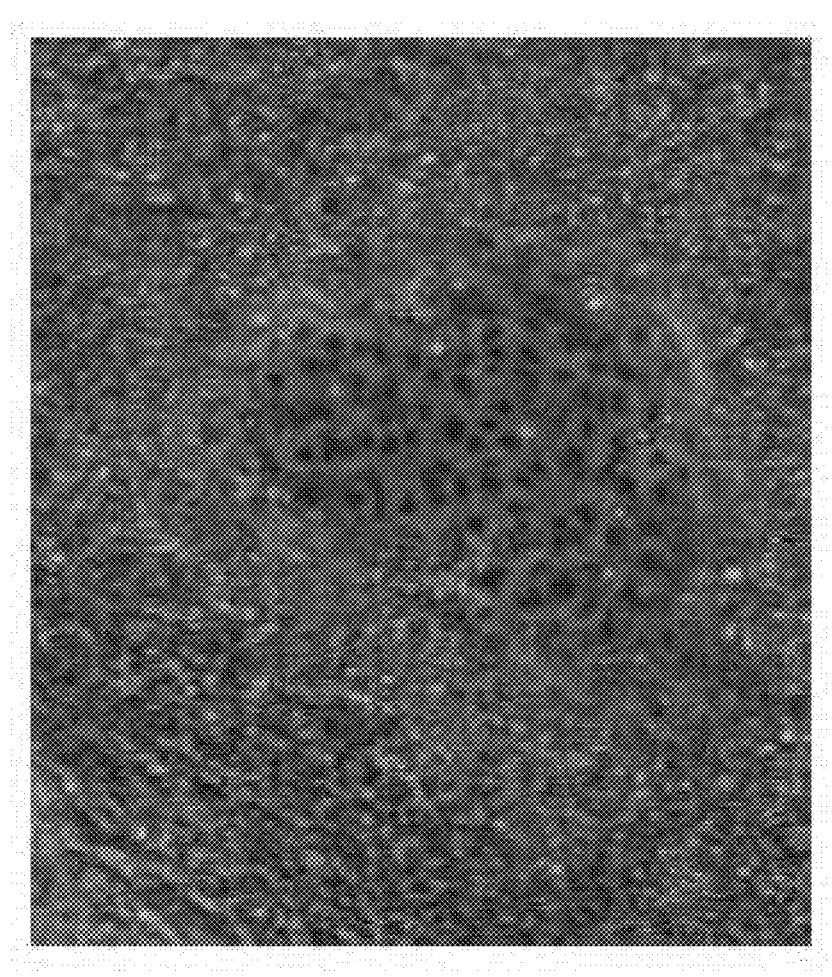
FIG. 8 shows an image of a typical stem cell colony which was used to illustrate the various graphical outputs.

These graphical outputs will naturally be affected by which of the two classification algorithms, nine training sets and three window sizes is used. To illustrate, the various Tier 1 graphical outputs that we can create, we consider the SVM and KLD analyzes of a colony using training set 5 (tight texture+loose textured) with window size 55×55, as seen in FIG. 8.

Examining the stem cell colony, we notice the loose texture in the center of the colony. This region of the colony is clearly differentiated. Immediately surrounding this center region is a ring of tight texture, followed by generally good, though not as tight, texture in the outer portion of the colony. We expect the various graphical outputs from our SVM and KLD segmentation algorithms to capture these features of this particular stem cell colony.

Binary Reclassified Image

By plotting those pixels classified as good (pixels for which $f(x_i)=1$) in white and those classified as bad (pixels for which $f(x_i)=-1$) in black, we can create a binary reclassified image. This output segments those areas of the colony interior that are healthy from those than are differentiated and unhealthy. Additionally, the amount of black, or poor, regions in the reclassified image provides a measure of the overall quality of the colony relative to all the other colonies being examined. Thus, the binary reclassified images serve as both a means of analyzing quality within an individual colony and across all the colonies under consideration. Thus, the SVM and KLD methods both successfully segment the differentiated center region of the colony.

Locally Normalized Confidence Reclassified Image

Where the binary reclassified image displays the binary classifications $f(x_i)$ of each pixel, the locally normalized confidence reclassified image displays the confidence values $h(x_i)$. While these confidence values are technically unbounded, for graphical display purposes we need to normalize them to the interval [0 1]. We do this by examining the specific colony under consideration and assigning the lowest confidence in the image to 0, the highest confidence to 1 and the rest of the confidence values linearly to the [0 1] interval. The resulting representation highlights the subtle differences in textural quality that exist across the colony. Since the normalization to the [0 1] interval is local to the specific colony, locally normalized confidence reclassified images should not be used to compare textural quality among multiple different colonies.

Figure 9:
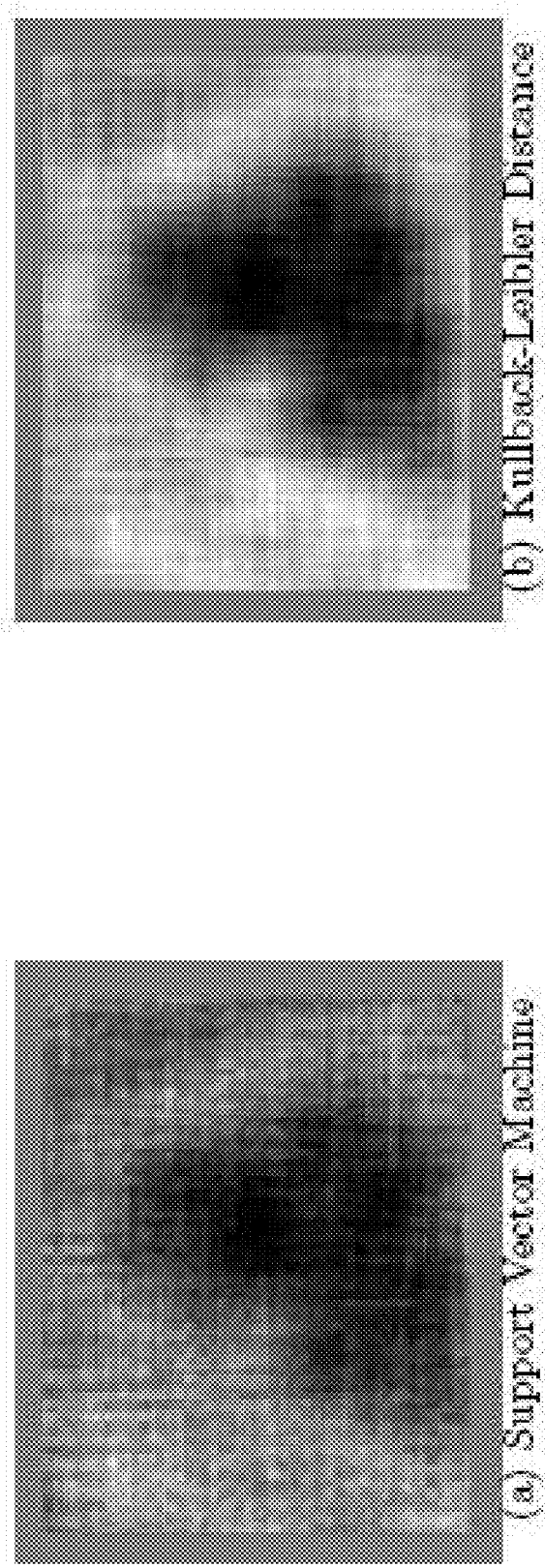
FIGS. 9A and 9B show images of the locally normalized confidence reclassified images based on the support vector machine (SVM) and the Kullback-Leibler Distance (KLD) algorithms.

FIG. 9 shows this representation using both the SVM and KLD classification algorithms. As with the binary representation, these images clearly show the differentiated inner region. Additionally, the use of the more detailed confidence values highlights the difference in texture quality between the ring surrounding the center region and the outer portion of the colony. The lighter contrast of the ring compared to the outer region shown in both images, though more clearly in the KLD representation-demonstrates the usefulness of using the confidence values to create a higher resolution graphical reclassification of the colony.

Globally Normalized Confidence Reclassified Image

A drawback of the locally normalized confidence reclassified images described above is their unsuitability in making comparisons of textural quality across multiple different colonies. To allow for this inter-colony comparison, we introduce globally normalized confidence reclassified images. For a given classification algorithm, training set and window size we find the lowest and highest confidence values across all 77 analyzed colonies. These global extreme points are assigned the values 0 and 1, respectively. Then the remaining confidence values in all the colonies are linearly scaled to the [0 1] interval. The result is a set of reclassified images that show less detail in each individual image but can be used to make textural quality comparisons among the different colonies.

Figure 10:
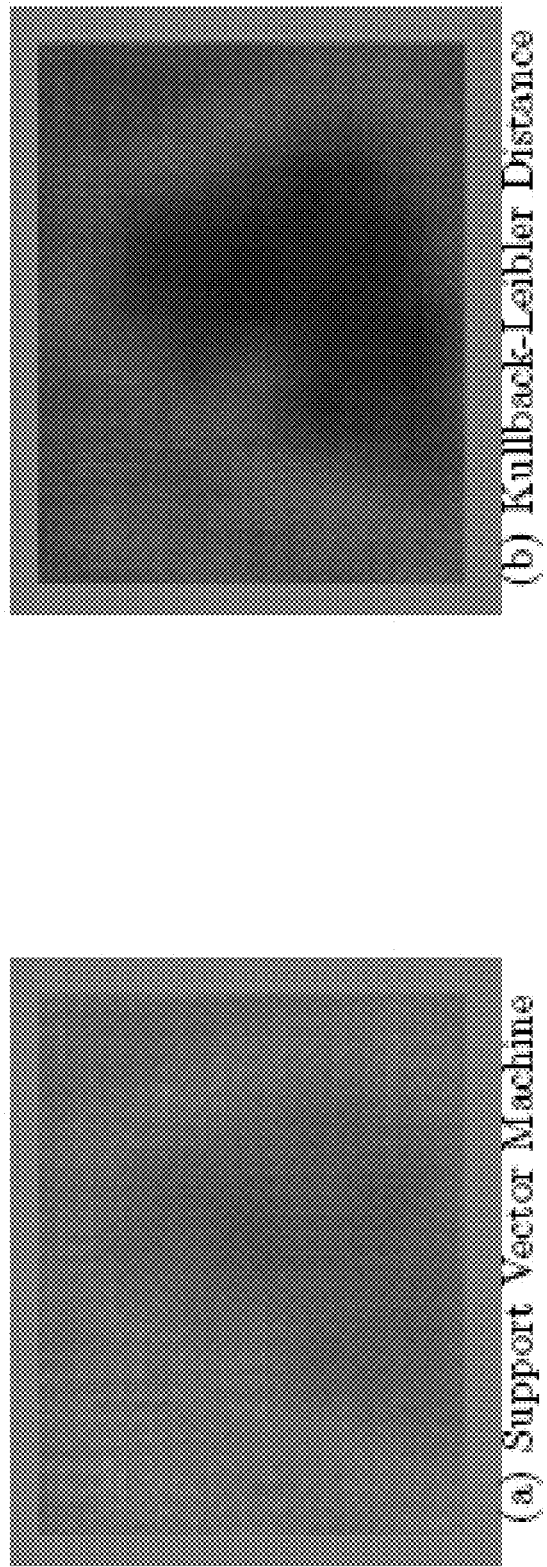
FIGS. 10A and 10B show images of the globally normalized reclassified representation using the SVM and KLD algorithms.

FIG. 10 shows the globally normalized reclassified representation using the SVM and KLD algorithms. Though we can still make out the textural variation within the colony, the global normalization smoothes out the contrast. While not particularly useful when analyzing only one colony, this representation would be necessary for a comparison of the relative qualities of a collection of stem cell colonies.

Quality Movie

The final graphical output we suggest consists of a series of images that shows the emergence of unhealthy regions of the stem cell colony. This quality movie is actually a simple dynamic representation of the locally normalized confidence reclassified image. The frames in the movie are created by imposing various thresholds (from 0 to 1) on the locally normalized confidence reclassified image; those confidence values falling above the threshold are plotted as white and those falling below as black. As the movie is played, the poorest regions of the colony will quickly appear in black, followed by regions of steadily improving quality.

A quality movie using the information from the KLD version of the locally normalized confidence reclassified image was applied to the colony in FIG. 8. The movie confirms our observations about the colony in FIG. 8. The differentiated center region appears first, followed by the outer area; the ring of tight texture around the center region appears last, highlighting its good textural quality.

Two-Stage Qualitative Analysis

Since each of the four graphical outputs described above provides a different insight into the quality of a researcher's stem cell colonies, we propose a two-stage examination scheme to effectively use all the available information. The binary reclassified and globally normalized confidence reclassified representations of all the colonies under consideration should first be examined. Since these two representations allow for comparisons among different colonies, they can be used to identify the clearly healthy and unhealthy colonies. The healthy colonies can be immediately retained for further subculturing while the clearly unhealthy colonies can be disregarded. The remaining inconclusive colonies can then be analyzed further using their associated locally normalized confidence reclassified images and quality movies. This closer analysis will highlight the portions of these colonies that can be salvaged and used for subculturing or further biological experimentation.

Reclassified Image Comparisons

The differences in the Tier 1 graphical outputs between the SVM and KLD methods, may be analyzed by considering the binary and locally normalized confidence reclassified representations using four colonies. The outputs may be obtained by using training set 5 (tight texture+loose texture) and a 55×55 window. A comparison of the various SVM and KLD outputs across the four colonies, showed very little difference between the two methods. Both methods generally segment the colonies into the same good and bad regions. The KLD method is more extreme in its segmentations; it produces clearer boundaries between good and bad regions in the binary images and shows a larger contrast in the grayscale values between good and bad regions in the confidence images. The SVM outputs tend to exhibit less-defined boundaries and a more even contrast in the binary and confidence reclassified images.

Training Set Effects

FIGS. 16-19 show the nine outputs for each of the four colonies. The original colony is shown at the top of each figure, and the SVM binary reclassified outputs are arranged in increasing training set number from left to right and top to bottom. Thus, looking across the rows shows the effects of training on the different types of bad texture (black, loose or composite) for a fixed type of good texture; looking down the columns shows the effects of the type of good texture (flat, tight or composite) for a fixed bad texture.

TABLE 4.2

Nine Tier 1 Training Sets (Review)

| Training Set Number | Paired Texture Types |
|---|---|
| 1 | flat texture + black texture |
| 2 | flat texture + loose texture |
| 3 | flat texture + composite bad |
| 4 | tight texture + black texture |
| 5 | tight texture + loose texture |
| 6 | tight texture + composite bad |
| 7 | composite good + black texture |
| 8 | composite good + loose texture |
| 9 | composite good + composite bad |

Figure 11:
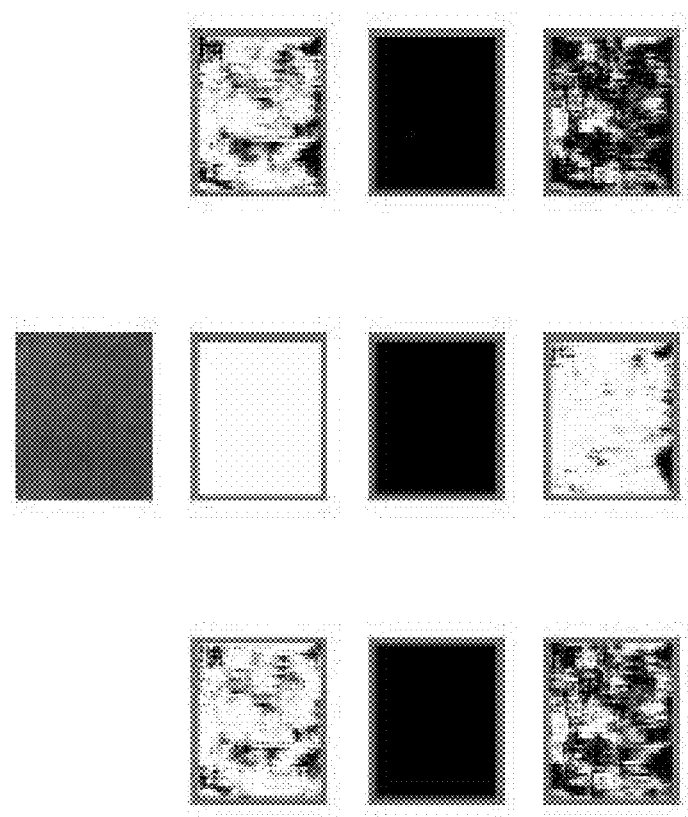
FIG. 11 shows images of the nine output training set effects for colony 1. The original colony is shown at the top of the figure, and the SVM binary reclassified outputs are arranged in increasing training set number from left to right and top to bottom

Colony 1 in FIG. 11, is a high quality colony because of its homogeneous flat texture. However, this flat homogeneity causes of the wildly different binary reclassified representations of the colony. When using training sets 4, 5 and 6 (the middle row in the figure), the classifier cannot recognize the high quality of the flat-textured colony since it has only been trained to recognized tight texture as signifying colony quality. In contrast, when the classifier is trained to recognize flat regions as high quality, solely (top row) or in combination with the tight textured definition (bottom row), the resulting segmentations are more accurate.

Figure 12:
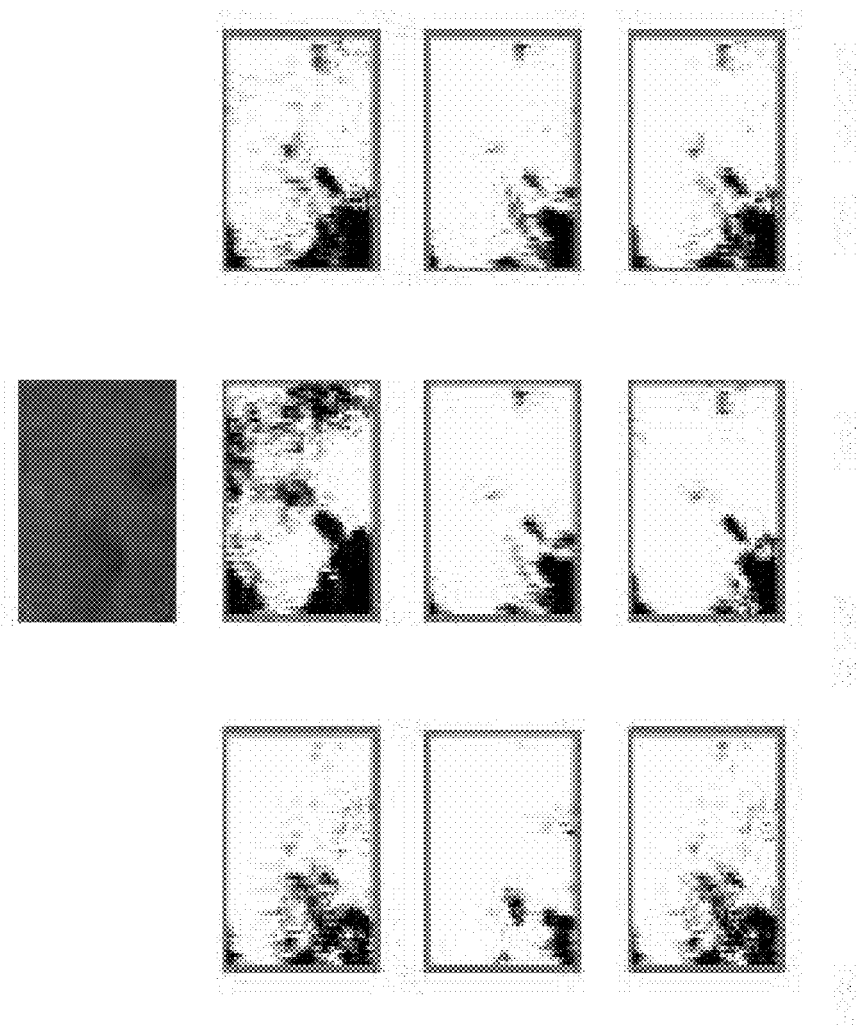
FIG. 12 shows images of the nine output training set effects for colony 2. The original colony is shown at the top of the figure, and the SVM binary reclassified outputs are arranged in increasing training set number from left to right and top to bottom

The training set effects are not as clear for Colony 2 in FIG. 12. FIG. 12 shows that the binary images in the first column do not segment as clearly the loose textured region in the lower left corner of the original colony. This is due to the fact that the classifier for these images has been trained using the black texture definition of poor quality rather than the loose texture definition. Thus, it has trouble clearly classifying this area of loose texture as a bad region.

Figure 13:
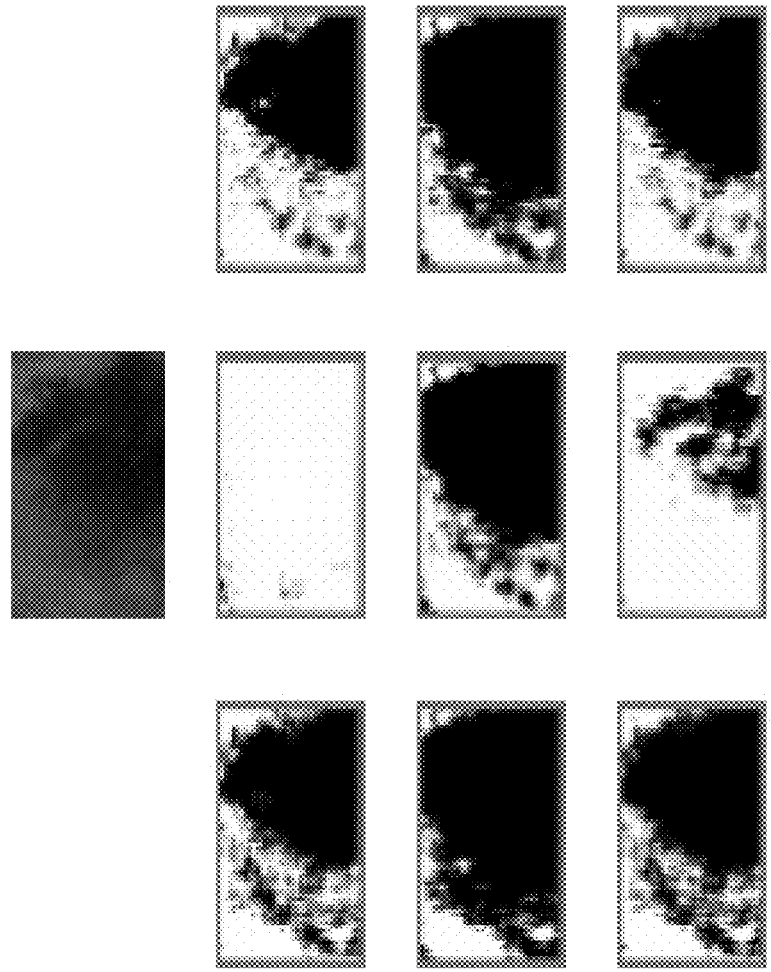
FIG. 13 shows images of the nine output training set effects for colony 3. The original colony is shown at the top of the figure, and the SVM binary reclassified outputs are arranged in increasing training set number from left to right and top to bottom

In FIG. 13, Colony 3 shows an obvious dark portion in its center, signifying a poor quality region. In those binary images for which the black texture definition is employed (first and last columns), a clear classification of the dark central region as bad can be seen. However, for training sets 2 and 8, where the loose texture definition is used, the classifier cannot clearly distinguish the poor central black region.

The binary output for training set 5 presents an interesting case. Even though it is not trained to recognize black regions as bad, it still performs well in its segmentation of the center region. This is due to the fact that it is also trained to recognize tight texture as good. Since the texture surrounding the dark center is relatively tight, it correctly classifies this surrounding region and simply finds the center region less similar to tight texture than to loose texture, thus correctly classifying it as bad.

Figure 14:
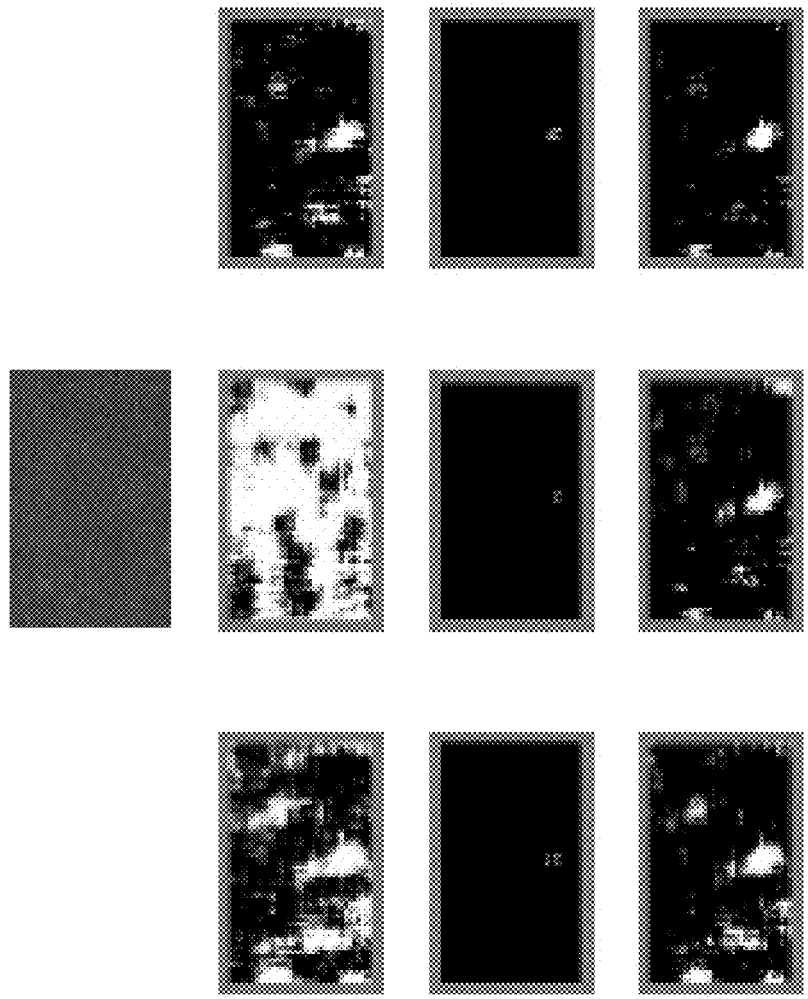
FIG. 14 shows images of the nine output training set effects for colony 4. The original colony is shown at the top of the figure, and the SVM binary reclassified outputs are arranged in increasing training set number from left to right and top to bottom

All but one of the outputs for Colony 4 in FIG. 14, classify the colony as almost completely of poor quality. The binary reclassified image using training set 2 (middle image in the top row) is the one exception. It is perhaps ironic that the SVM classifier used to create this reclassified image, trained to distinguish explicitly between flat and loose texture, would fail on a colony exhibiting extremely loose texture throughout. However, under further examination, the result makes sense for two reasons. First, since Colony 4 is the only one among the 77 colonies with such a loose texture, its extreme texture is not included in the training data since it does not represent the colony images at our disposal very well. Thus, it is rightfully difficult for the classifier to correctly segment the colony. Secondly, the windows used to capture the textural qualities of the colony are not large enough to recognize such a loose texture. Instead, these windows see only the flat regions among the widely-dispersed cells that create the colony's loose texture. Since the classifier is trained to recognize flat texture as good, it tends to incorrectly classify the very loose, bad texture as tight, good texture.

Window Size Effects

Along with classification method and training set, the window size can conceivable affect the resulting stem cell colony segmentation. These window size effects are examined by considering the SVM binary reclassified images for each of the four colonies using training set 5 (tight texture+loose texture). The windows were 55×55, 45×45, and 35×35. Most common window size effect among the four colonies appears to be the increased speckling with the 35×35 window. This is attributed to the increased locality of the analysis with this smaller window size; the larger windows naturally smooth out the local irregularities in the image. On the whole however, there are no significant window size effects that influence the results.

EXAMPLE 2

Stem Cell Application: Quantitative Image Categorization

We frame quantitative image categorization analysis as a multiclass, or multiway categorization problem where we attempt to classify each full stem cell colony into one of several quality categories. Following machine learning classification methodologies, we consider again the two steps of feature representation and classification, operating now at the full colony level rather than the pixel level of the benchmark and Tier I segmentation work.

Quantitative Colony-Wise Feature Extraction

Just as feature representation on the pixel level was the first step for the Tier 1 analysis, feature extraction on a colony level is the first Tier 2 task. Where the Tier 1 analysis worked at the level of local windows extracted about each pixel of the stem cell colony images, we now expand to the level of the entire colony in order to provide a quantitative measure of overall colony quality. These colony-wise features should capture the aggregate health of the colony.

We accomplish this by deriving features based on the criteria of stem cell colony quality: textural homogeneity, textural tightness, and border sharpness and circularity.

Since the first two criteria reference interior textural quality and the third focuses on border quality, we similarly partition the colony-wise features into two sets, those that characterize texture quality and those that consider border quality.

Interior Texture Feature Extraction

We conjecture that we can capture the interior textural quality of a stem cell colony by considering the percent of the colony interior that is healthy and undifferentiated, and the level of homogeneity of healthy regions across the colony.

We use four colony-wise features, called mean features, to capture the first characteristic and six features, called variance features, for the second.

All ten colony-wise interior texture features are easily calculated from the Tier 1 outputs. Recall that the Tier I analysis performed a pixel-by-pixel classification of the interior region of each stem cell colony. Furthermore, each colony was analyzed using both the SVM and KLD classifiers with three different window sizes and nine different training sets. Thus, for a fixed Tier 1 window size and training set, we have binary classifications $f_{SVM}(x_i)$ and $f_{KLD}(x_i)$ and confidence values $h_{SVM}(x_i)$ and $h_{KLD}(x_i)$ for each pixel xi in the colony interior, depending on whether we employ the outputs from the SVM or KLD classifier. We derive the colony-wise interior texture features using these binary classification and confidence values. Additionally, we derive these features assuming a fixed Tier 1 window size and training set.

Mean Features

The first measure of interior texture quality listed above states that the percentage of healthy area in the colony interior reflects the relative quality of the colony itself For example, a colony whose interior consists of a single high-quality region would be considered of high quality as a whole. A colony where only half of the interior area is healthy would itself be rated a mediocre colony. Since the Tier 1 output provided a pixel-by-pixel classification of each colony interior, this framework suggests the use of the mean operator across those Tier I binary classifications $f(x_i)$ and confidence values $h(x_i)$.

For computational purposes, we first make a slight modification to the output of the SVM and KLD classification function $f(x_i)$. Instead of letting $f(x_i)=-1$ for a poor quality pixel xi, we instead set $f(x_i)=0$. To then find the percentage of good pixels across the colony, we can simply calculate the colony average of the $f(x_i)$ values. Depending on whether we use the SVM or KLD classification method, we have the following SVM texture binary mean and KLD texture binary mean features:

$$\mu_{f:SVM} = \frac{1}{N}\sum_{i=1}^{N} f_{SVM}(x_i) \quad (5.1)$$

$$\mu_{f:KLD} = \frac{1}{N}\sum_{i=1}^{N} f_{KLD}(x_i) \quad (5.2)$$

where N is the number of pixels in the interior of the stem cell colony being considered. Taking the average confidence values across each colony interior provides a higher-resolution colony-wise feature for the Tier 2 analysis. Thus, we have the following SVM texture confidence mean and KLD texture confidence mean features:

$$\mu_{h:SVM} = \frac{1}{N}\sum_{i=1}^{N} h_{SVM}(x_1) \quad (5.3)$$

$$\mu_{h:KLD} = \frac{1}{N}\sum_{i=1}^{N} h_{KLD}(x_1) \quad (5.4)$$

Variance Features

The second measure of interior textural quality listed above is based on the homogeneity criterion of stem cell quality.

That criterion states that a healthy colony exhibits textural homogeneity across the entire colony.

Figure 15:
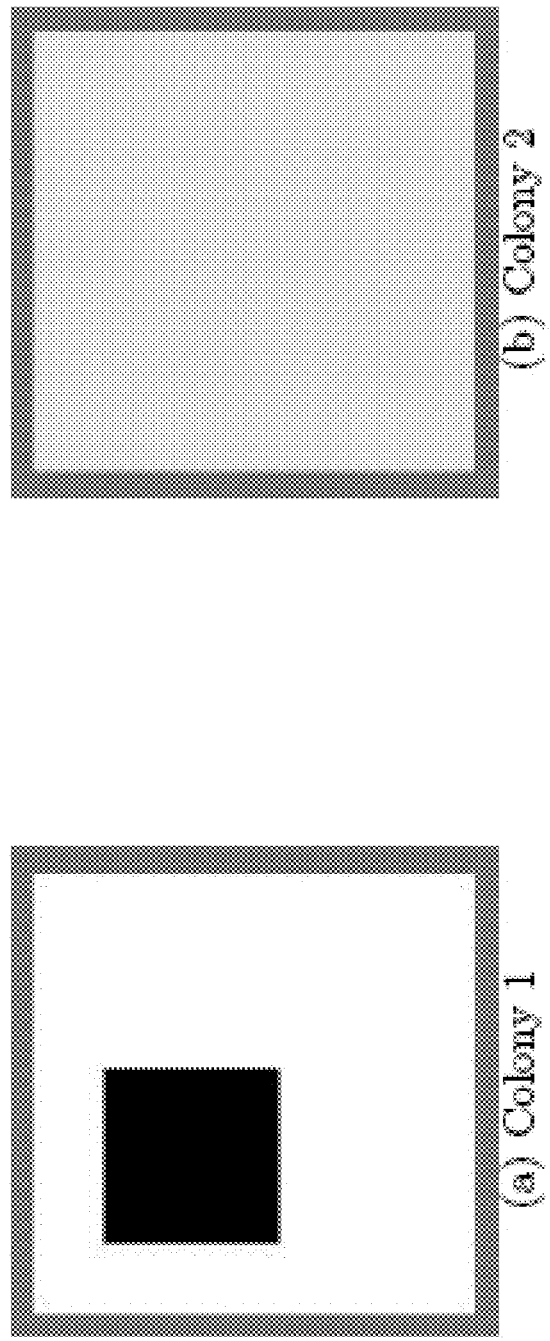
FIGS. 15A and 15B show images of the confidence reclassified images of two toy colonies.

The four mean features in Equations 5.1 through 5.4 do not necessarily capture this homogeneity characteristic. For example, consider the confidence reclassified images of the two toy colonies in FIG. 15. Outside of the obvious poor area in its interior, Colony 1 exhibits excellent quality. It returns a confidence mean value of 0.874. Colony 2 also has a confidence mean of 0.874 on account of the slightly degraded quality throughout. Thus, even though Colony 2 is clearly the superior colony due to its homogeneity, the confidence mean features cannot distinguish between the two.

However, we could use the variance operator to create features that capture the difference in the homogeneity of the two colonies and thus distinguish between them. Indeed, the variance in the confidence values across Colony 1 of 0.1101 is clearly distinguishable from the variance of 0 for Colony 2.

Using the above example as motivation, we introduce four variance-based features: SVM texture binary variance, KLD texture binary variance, SVM texture confidence variance and KLD texture confidence variance. Their respective mathematical expressions are, $$\sigma^2_{f:SVM} = \frac{1}{N}\sum_{i=1}^{N}(f_{SVM}(x_i) - \mu_{f:SVM})^2 \quad (5.5)$$

$$\sigma^2_{f:KLD} = \frac{1}{N}\sum_{i=1}^{N}(f_{KLD}(x_i) - \mu_{f:KLD})^2 \quad (5.6)$$

$$\sigma^2_{h:SVM} = \frac{1}{N}\sum_{i=1}^{N}(h_{SVM}(x_i) - \mu_{h:SVM})^2 \quad (5.7)$$

$$\sigma^2_{h:KLD} = \frac{1}{N}\sum_{i=1}^{N}(h_{KLD}(x_i) - \mu_{h:KLD})^2 \quad (5.8)$$

where N is the number of pixels in the colony interior being considered and the μ expressions are the mean features defined in Equations 5.1 through 5.4 above.

We introduce two additional outlier-based features to augment the variance features above in characterizing homogeneity. Specifically, we define new 35×35 windows about each pixel in the colony under consideration. We then calculate the local confidence mean within each window. If the local mean value for a given pixel's window differs by more than two standard deviations from the confidence mean across the entire colony, we declare the pixel to be an outlier. We define the SVM texture outlier and KLD texture outlier features to be the total number of outlier pixels across the colony using the SVM and KLD classifiers, respectively. Mathematically, we have, $$\xi_{SVM} = \sum_{i=1}^{N} \delta(|\mu^{(i)}_{h:SVM} - \mu_{h:SVM}| > 2\sigma_{h:SVM}) \quad (5.9)$$

$$\xi_{KLD} = \sum_{i=1}^{N} \delta(|\mu^{(i)}_{h:KLD} - \mu_{h:KLD}| > 2\sigma_{h:KLD}) \quad (5.10)$$

where N, μ and σ are as above, $\mu^{(i)}_{h:SVM}$ and $\mu^{(i)}_{h:KLD}$ are the local means of the SVM and KLD confidence values within the 35×35 window about pixel $x_i$, and δ(•) is a function that returns a 1 if its argument is satisfied and a 0 otherwise.

Feature Summary

Motivated by the textural criteria for stem cell colony quality and confirmed by an expert in the field of stem cell microscopy, we have proposed ten colony-wise features that characterize the overall health and quality of the interior region of a stem cell colony. Additionally, all ten features can be easily calculated from the outputs of the Tier 1 analysis. Thus, there is little additional computational cost in extracting these colony-wise features. All ten colony-wise interior texture features are summarized in Table 5.1 for a fixed Tier 1 window size and training set.

Relaxing the assumption of a fixed Tier 1 window size and training set, we find that we actually have 3·9=27 different versions of the ten colony-wise interior texture features of Table 5.1. Each version depends on the specific window size and training set employed in the Tier 1 analysis to calculate the binary classifications $f_{SVM}(x_i)$ and $f_{KLD}(x_i)$

TABLE 5.1

Tier 2 Colony-Wise Interior Texture Features

| Feature Name | Feature Symbol | Formula |
|---|---|---|
| SVM Texture Binary Mean | $\mu_{f:SVM}$ | $\frac{1}{N}\sum_{i=1}^{N} f_{SVM}(x_i)$ |
| KLD Texture Binary Mean | $\mu_{f:KLD}$ | $\frac{1}{N}\sum_{i=1}^{N} f_{KLD}(x_i)$ |
| SVM Texture Confidence Mean | $\mu_{h:SVM}$ | $\frac{1}{N}\sum_{i=1}^{N} h_{SVM}(x_i)$ |
| KLD Texture Confidence Mean | $\mu_{h:KLD}$ | $\frac{1}{N}\sum_{i=1}^{N} h_{KLD}(x_i)$ |
| SVM Texture Binary Variance | $\sigma_{f:SVM}^2$ | $\frac{1}{N}\sum_{i=1}^{N} (f_{SVM}(x_i) - \mu_{f:SVM})^2$ |
| KLD Texture Binary Variance | $\sigma_{f:KLD}^2$ | $\frac{1}{N}\sum_{i=1}^{N} (f_{KLD}(x_i) - \mu_{f:KLD})^2$ |
| SVM Texture Confidence Variance | $\sigma_{h:SVM}^2$ | $\frac{1}{N}\sum_{i=1}^{N} (h_{SVM}(x_i) - \mu_{h:SVM})^2$ |
| KLD Texture Confidence Variance | $\sigma_{h:KLD}^2$ | $\frac{1}{N}\sum_{i=1}^{N} (h_{KLD}(x_i) - \mu_{h:KLD})^2$ |
| SVM Texture Outlier | $\xi_{SVM}$ | $\sum_{i=1}^{N}\delta(\|\mu^{(i)}_{h:SVM} - \mu_{h:SVM}\| > 2\sigma_{h:SVM})$ |
| KLD Texture Outlier | $\xi_{KLD}$ | $\sum_{i=1}^{N}\delta(\|\mu^{(i)}_{h:KLD} - \mu_{h:KLD}\| > 2\sigma_{h:KLD})$ | and confidence values $h_{SVM}(x_i)$ and $h_{KLD}(x_i)$ then used to derive the colony-wise features. Considering these 27 versions, we actually have 10·(3·9)=270 available features to characterize the interior texture of a stem cell colony.

Border Feature Extraction

The original border criterion dictates that a good colony exhibits a sharp and circular border. We consider a revised border criterion that a good colony border will contain high quality texture immediately interior to the colony border. This revision has a strong biological justification. Namely, we find that stem cell colonies generally show the first signs of degradation and differentiation in two specific regions: the center and border regions of the colony. Since this degradation is reflected in the texture of the stem cells in those regions, by analyzing texture in the border region we hope to capture the border quality of the colony.

Border Window Extraction

Implementing the revised border criterion involves analyzing texture quality in the border region. Just as we defined windows around each pixel of the colony interior, calculated wavelet-based texture features and classified each pixel according to those features using the SVM and KLD methods, we now perform the same basic tasks on the border region.

The first step involves explicitly defining the colony border. This process of border segmentation can be performed manually. With these defined borders, we then extract windows about each border pixel on which to perform the textural analysis that we use to characterize the overall border quality in accordance with the revised border criterion. To speed up implementation of this process, we employ an automated method requiring the user to specify only one parameter, the colony centroid. This centroid location partitions the image into four quadrants. A window is then placed about each border pixel in an orientation dictated by the quadrant in which the pixel lies.

TABLE 5.2

Tier 2 Colony-Wise Border Features

| Feature Name | Feature Symbol | Formula |
|---|---|---|
| SVM Border Binary Mean | $\mu_{f:SVM}$ | $\frac{1}{N}\sum_{i=1}^{N} f_{SVM}(x_i)$ |
| KLD Border Binary Mean | $\mu_{f:KLD}$ | $\frac{1}{N}\sum_{i=1}^{N} f_{KLD}(x_i)$ |
| SVM Border Confidence Mean | $\mu_{h:SVM}$ | $\frac{1}{N}\sum_{i=1}^{N} h_{SVM}(x_i)$ |
| KLD Border Confidence Mean | $\mu_{h:KLD}$ | $\frac{1}{N}\sum_{i=1}^{N} h_{KLD}(x_i)$ |
| SVM Border Binary Variance | $\sigma_{f:SVM}^2$ | $\frac{1}{N}\sum_{i=1}^{N} (f_{SVM}(x_i) - \mu_{f:SVM})^2$ |
| KLD Border Binary Variance | $\sigma_{f:KLD}^2$ | $\frac{1}{N}\sum_{i=1}^{N} (f_{KLD}(x_i) - \mu_{f:KLD})^2$ |
| SVM Border Confidence Variance | $\sigma_{h:SVM}^2$ | $\frac{1}{N}\sum_{i=1}^{N} (h_{SVM}(x_i) - \mu_{h:SVM})^2$ |
| KLD Border Confidence Variance | $\sigma_{h:KLD}^2$ | $\frac{1}{N}\sum_{i=1}^{N} (h_{KLD}(x_i) - \mu_{h:KLD})^2$ |

By following this process for each of the 77 colonies, we can extract the border windows on which to perform wavelet-based texture analysis. Specifically, we extract border windows of size 35×35, 45×45 and 55×55 and run these windows through SVM and KLD algorithms using each of the nine training sets outlined in Example 1. This results in the various binary classifications $f_{SVM}(x_i)$ and $f_{KLD}(x_i)$ and confidence values $h_{SVM}(xi)$ and $h_{KLD}(x_i)$ for a fixed window size and training set that characterize each border pixel xi of each colony.

Colony-Wise Border Features

Consider for now that we have fixed the window size and training set used in the border window analysis. Then, using the resulting binary classifications and confidence values for each border pixel, we calculate eight colony-wise border features analogous to the first eight colony-wise interior texture features. That is, we take the mean and variance of the binary and confidence values across each colony's border pixels using both the SVM and KLD methods. These features are summarized in Table 5.2.

As with the colony-wise interior texture features, if we relax the assumption of a fixed window size and training set, we actually have 8·(3·9)=216 available colony-wise border features to characterize the border of a stem cell colony.

TABLE 5.3

Full Colony Rating Scale

| Category | Description |
|---|---|
| 1 | Great texture and sharp edges |
| 2 | Imperfect but good colony Some darkening or thinning of the edge or center of the colony Starting to differentiate |
| 3 | Compromised colony with a significant thinning of the edge or thickening of the center of the colony |
| 4 | Poor colony with some usable cells Mostly differentiated |
| 5 | Unusable colony with no usable stem cells Nearly complete differentiation |

Expert Rating of Colony Quality

Having defined the characteristics that we use to create the colony-wise feature vectors xi, i=1, 2, . . . , 77, for each full colony in the categorization process, we now turn to defining the true labels, or ratings $y_i \in \{1, 2, \ldots, 5\}$ that we associate with each colony. This labelling was provided by an experienced stem cell research biologist, and we consider his expert rating to be the "truth" in the sense that it is the standard with which we compare the outputs from our categorization methodology.

This rating is based on overall colony quality using all three stem cell quality criteria. Table 5.3 lists the specific guidance used to rate the colonies into the five categories.

Quantitative Colony-Wise Classification

With colony-wise feature vectors xi and associated multiclass labels $y_i$, we have accomplished the feature extraction step of the machine learning classification paradigm as applied to the full stem cell colonies. We must now choose a classification method that can use these colony-wise features to accurately categorize the full colony images into the five (or four) quality categories described above. We again choose the support vector machine.

While algorithmically similar to the SVM employed in Example 1 for the task of image segmentation, we now consider a new instantiation of the method. We replace wavelet energy features with the colony-wise features defined above, and instead of making binary pixel-by-pixel classifications, we make multiway colony-wise classifications. Additionally, training and test data consists now of full stem cell colonies rather than textural windows.

Multiclass SVM Formulation

There exist a number of methods for formulating multiway classifiers. Most of these simply involve running a combination of binary classifications and combining the results to arrive at a multiclass solution. Examples include the one-vs-one (P. Moreno and R. Rifkin. Using the Fisher kernel method for web audio classification. In International Conference on Acoustics, Speech and Signal Processing, Istanbul, Turkey, 2000) and decision tree (Fumitake Takahashi and Shigeo Abe. Decision-tree-based multiclass support vector machines. In Proc. 9th International Conference on Neural Network Information Processing, volume 3, pages 1418-1422, November 2002) approaches. The multiclass problem can also be considered in the more flexible framework of error correcting output codes (ECOC). Thomas G. Dietterich and Ghulum Bakiri. Solving multiclass learning problems via error-correcting output codes. Journal of Artificial Intelligence Research, 2:263-286, 1995. In essence, all of these multiclass approaches are generic as they simply provide a framework for combining binary classifications into multiclass results; thus, any suitable binary method can be employed as the underlying classifier.

As mentioned above, we choose to use the support vector machine as our underlying binary classification method. Additionally, we employ a specific implementation of the ECOC framework, namely the one-vs-all approach.

Training the one-vs-all k-class SVM involves creating k different binary classifiers. For the ith binary classifier, we train data from the ith class against a composite data set of the remaining k−1 classes. This yields a function $h_i(x)$ that we interpret as returning the confidence that a stem cell colony x should be classified into class i. Training all k binary classifiers yields a vector of confidence functions $(h_1(x), h_2(x), \ldots h_k(x))$.

We then apply the multiway classification function (Jason D. M. Rennie and Ryan Rifkin. Improving multiclass text classification with the support vector machine. Technical report, Massachusetts Institute of Technology, 2002. Revised AI Memo-2001-026), $$H(x) = \arg\max_{j \in \{1, \ldots, k\}} h_j(x) \qquad (5.11)$$

to classify a colony x into one of the k classes. Intuitively, Equation 5.11 dictates that we classify the colony x to the class which is the most confident of x belonging to it rather than not. For k=2, this multiclass approach collapses to the standard binary SVM classifier.

Run Setup

Simply stated, the goal of the Tier 2 problem is to use colony-wise feature vectors to classify stem cell colonies into five (or four) categories. An obvious, but unrefined solution approach dictates that we attempt a full five-way (or four-way) categorization of the available stem cell colonies using all 486 colony-wise features (270 interior texture features and 216 border features) as inputs. This approach has several drawbacks.

First, using all 486 features results in an excessively high dimensional feature vector. Even the SVM, with its ability to handle high dimensional feature vectors, would not be expected to successfully identify which of the 486 features are truly useful in defining the underlying structure of the colony categorization problem. As a remedy, before running the SVM classifier, we perform feature selection in order to reduce the dimensionality of the feature vectors seen by the SVM. We describe our methodology below.

The practical result of implementing these two modifications is that we replace the single, infeasible run described above with a series of well-selected smaller runs. By then defining optimality criteria with respect to these smaller problems, we can report results and make conclusions regarding the Tier 2 problem of using colony-wise features to classify stem cell colonies into quality categories.

Feature Selection

The first modification we make to the single, full run described above involves feature selection. There exist 486 colony-wise features that we can use to characterize a given stem cell colony. This high dimensionality in the face of limited training data will naturally result in ineffective categorization. However, by first reducing the dimensionality of the feature vectors, we hope to attain legitimate results.

Approaches to feature selection have been considered both for general data analysis problems and specifically for the support vector machine. One general approach involves performing a regression analysis on the input data and employing feature selection methods tailored to the regression problem. Examples of such methods include forward stepwise selection, backward stepwise selection, ridge regression and principal components analysis. T. Hastie, R. Tibshirani, and J. Friedman. The Elements of Statistical Learning: Data Mining, Inference, and Prediction. Springer, New York, 2001. Only those features found to be the significant in this preanalysis are then used as inputs to the chosen classification method. Another approach might involve using various data mining algorithms such as CART and MART-designed specifically to mine for useful information or features in large and messy data sets-to determine the most important features to be used as inputs in the final classification scheme. T. Hastie, R. Tibshirani, and J. Friedman. The Elements of Statistical Learning: Data Mining, Inference, and Prediction. Springer, New York, 2001.

Direct feature selection for the SVM is not difficult when a linear kernel is employed. In that case, one need only calculate the w vector defining the optimal hyperplane and identify the most influential features as those whose components in the w vector have the largest absolute values. For other kernels such as the polynomial and radial basis function kernels that we use in this work, feature selection is rather more difficult. Nevertheless, methods for nonlinear SVM feature selection have been developed and are discussed in the literature. Lothar Hermes and Joachim M. Buhmann. Feature selection for support vector machines. In Proc. of the International Conference on Pattern Recognition (ICPR'00), volume 2, pages 716-719, 2000. J. Weston, S. Mukherjee, 0. Chapelle, M. Pontil, T. Poggio, and V. Vapnik. Feature selection for SVMs. In Sara A Solla, Todd K Leen, and Klaus-Robert Muller, editors, Advances in Neural Information Processing Systems 13. MIT Press, Cambridge, Mass., 2001.

While these advanced feature selection methods might be considered in future work, we employ a simpler combinatorial approach. In general, this method involves choosing various subsets of the 486 features and running the SVM with each of the corresponding smaller feature vectors. Those features contained in the specific feature subset yielding the highest performance are determined to be the most influential.

A full combinatorial implementation where we run the SVM on every possible subset of the 486 features would require, $$\sum_{i=1}^{486} \binom{486}{i} \to \infty \qquad (5.12)$$

runs. Clearly, we must limit the subsets we consider. We do so by first fixing the Tier 1 window size and training set reducing our feature choices to the 10 colony-wise interior texture features listed in Table 5.1 and 8 colony-wise border features of Table 5.2. Instead of considering these features in isolation, we operate on various fixed combinations of features by creating seven interior texture feature groups and four border feature groups. By pairing one of the interior texture groups with one of the border feature groups, we can define the specific feature vector sent to the SVM.

The seven interior texture feature groups are listed in Table 5.4 via their corresponding feature symbol from Table 5.1 while the four border feature groups are shown in Table 5.5 referencing Table 5.2.

TABLE 5.4

Colony-Wise Interior Texture Feature Groups

| Group Name | Included Features |
| --- | --- |
| Texture Binary | $\mu_{f:SVM}, \mu_{f:KLD}, \sigma_{f:SVM}^2, \sigma_{f:KLD}^2$ |
| Texture Confidence | $\mu_{h:SVM}, \mu_{h:KLD}, \sigma_{h:SVM}^2, \sigma_{h:KLD}^2$ |
| Texture Outlier | $\zeta_{SVM}, \zeta_{KLD}$ |
| Texture Binary and Confidence | $\mu_{f:SVM}, \mu_{f:KLD}, \sigma_{f:SVM}^2, \sigma_{f:KLD}^2$ |
|  | $\mu_{h:SVM}, \mu_{h:KLD}, \sigma_{h:SVM}^2, \sigma_{h:KLD}^2$ |
| Texture Binary and Outlier | $\mu_{f:SVM}, \mu_{f:KLD}, \sigma_{f:SVM}^2, \sigma_{f:KLD}^2$ |
|  | $\zeta_{SVM}, \zeta_{KLD}$ |
| Texture Confidence and Outlier | $\mu_{h:SVM}, \mu_{h:KLD}, \sigma_{h:SVM}^2, \sigma_{h:KLD}^2$ |
|  | $\zeta_{SVM}, \zeta_{KLD}$ |
| All Texture | $\mu_{f:SVM}, \mu_{f:KLD}, \sigma_{f:SVM}^2, \sigma_{f:KLD}^2$ |
|  | $\mu_{h:SVM}, \mu_{h:KLD}, \sigma_{h:SVM}^2, \sigma_{h:KLD}^2$ |
|  | $\xi_{SVM}, \xi_{KLD}$ |

TABLE 5.5

Colony-Wise Border Feature Groups

| Group Name | Included Features |
| --- | --- |
| None | $\emptyset$ |
| Border Binary | $\mu_{f:SVM}, \mu_{f:KLD}, \sigma_{f:SVM}^2, \sigma_{f:KLD}^2$ |
| Border Confidence | $\mu_{h:SVM}, \mu_{h:KLD}, \sigma_{h:SVM}^2, \sigma_{h:KLD}^2$ |
| All Border | $\mu_{f:SVM}, \mu_{f:KLD}, \sigma_{f:SVM}^2, \sigma_{f:KLD}^2$ |
|  | $\mu_{h:SVM}, \mu_{h:KLD}, \sigma_{h:SVM}^2, \sigma_{h:KLD}^2$ |

Pairing each interior texture group with each border group results in $7 \cdot 4 = 28$ different feature sets. However, recall that the Tier 1 window size and training set has been fixed. By employing each of the three window sizes and each of the nine training sets on each of the 28 combinations described above, we actually have $3 \cdot 9 \cdot 28 = 756$ possible different feature vectors to be used as inputs into the SVM.

Finally, note that each of these 756 different feature vectors employs only one of the nine Tier 1 training sets. The choice of training set can have a significant impact on Tier 1 analysis. Since we have used the Tier 1 analyzes to create the Tier 2 colony-wise features, we expect that the training set choice will also affect the Tier 2 results. Thus, we also consider feature vectors containing features derived from all nine training sets. Considering the three window sizes, this adds $3 \cdot 28 = 84$ additional feature vectors.

Thus, our feature selection methodology results in the creation of $756 + 84 = 840$ different feature vectors. This is clearly more feasible than following the full combinatorial approach with its excessively large number of feature vectors. By running the SVM using each of these 840 feature vectors, we can calculate results for each and determine which specific features yield the best categorization performance.

Parameter Settings

Implementing the feature selection methodology discussed above requires us to run the SVM categorization algorithm 840 times to calculate results for each of the 840 different feature vectors. For each of these runs, we need to specify various SVM parameters. For simplicity, we choose to fix the SVM's cost parameter C to 1. However, we expect that the SVM kernel choice may affect the results of each run. Thus, we experiment with two different kernels, the polynomial of degree 2 and the radial basis function. By performing the 840 runs outlined above with each of these two kernels, we arrive at $840 \cdot 2 = 1680$ different Tier 2 runs, each reflecting a different setting of the colony-wise feature vector and multiclass SVM kernel.

Category Comparisons

We find it beneficial to perform, in addition to the full five-way (or four-way) categorization, various other category comparisons, such as pairwise or three-way comparisons. Specifically, for the five category case, we perform all ten pairwise comparisons, a comparison among categories 1, 3 and 5 and the five-way run. For the four category case where we have combined categories 1 and 2, we perform the six pairwise comparisons along with the full four-way comparison.

For each of these comparison runs, we need to specify training and test data from among the colonies involved. We accomplish this by randomly splitting the applicable colonies into disjoint training and test sets. For example, if we are comparing categories 1 and 2, we randomly split the category 1 colonies into a training and test set and the category 2 colonies into a training and test set. In order to achieve more accurate results, we perform each comparison run ten times using a random training test partition each time. We then take the average categorization rate over the ten runs as our performance measure.

Thus, the full Tier 2 analysis consists of performing each of the 1680 Tier 2 runs described above for each of these category comparisons. Arranging the categorization rates for each of the 1680 runs in a performance matrix, the Tier 2 analysis yields 1680 different performance matrices.

To find the specific feature vector and SVM kernel setting that yields the highest performance out of the 1680 different settings, we must sift through this performance data in a logical manner. We do so by defining two types of optimality, mean and individual. We then search through the 1680 performance matrices to identify the setting that satisfies each type of optimality.

Defining Optimality

For a specific setting to satisfy mean optimality, it must yield, among all 1680 different settings, the highest average performance across the various comparisons in the performance matrix. If no other setting of the feature vector and SVM kernel produces a higher average performance than its 80.57%, then this particular setting would be mean optimal.

Figure 16:
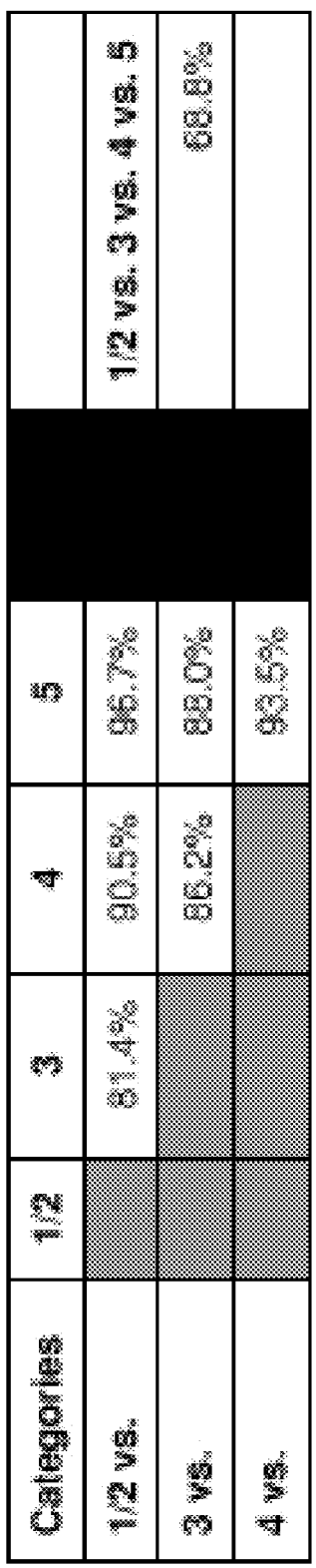
FIG. 16 shows a chart of an individual optimal performance matrix. The feature vector and SVM kernel setting that yields the highest performance for each category comparison is identified.

While mean optimality is defined on the level of the feature and parameter setting, individual optimality works at the category comparison level. That is, we search for the feature vector and SVM kernel setting that yields the highest performance for each category comparison. Thus, in contrast to mean optimality where a single setting is optimal across the entire performance matrix, the enforcement of individual optimality results in a potentially different optimal setting for each comparison. FIG. 16 illustrates the individually optimal results that we might achieve. For example, in comparing categories 4 and 5, no feature vector and SVM kernel setting will yield better performance than the specific individual optimal setting that produces the 93.5% rate in the figure. Additionally, the setting that produces the 86.2% when comparing between categories 3 and 4 would likely be different from the setting leading to the 88.0% rate for the category 3 and 5 comparison.

From a practical stem cell research perspective, these two optimality definitions have different interpretations and uses.

The use of individual optimality is appropriate in two practical cases. First, and most realistically, if a researcher has no prior information regarding the quality of a set of colonies and wishes to make a full four-way categorization, he should use the individual optimal setting for the four-way comparison. For the illustrative example in FIG. 16, the researcher would expect to be correct on 68.8% of the colonies. Secondly, consider a researcher who has a set of colonies that are known a priori to be generally poor. If he wishes to further quantify their poorness, he might only consider classifying them between categories 4 and 5. In that case, he would use the individual optimal setting for the category 4 and 5 comparison and expect a correct categorization 93.5% of the time.

While individual optimality is appropriate for making binary comparisons with prior knowledge, mean optimality should be used for binary comparisons without prior knowledge. In this case, a researcher could use the mean optimal setting to make all the different binary comparisons on an unknown colony yielding some information regarding the category to which the colony should be classified. Mean optimality is also useful for determining the overall performance ability of the Tier 2 methodology and for identifying trends in the feature and SVM parameter settings.

Mean Optimality Results

Figure 17:
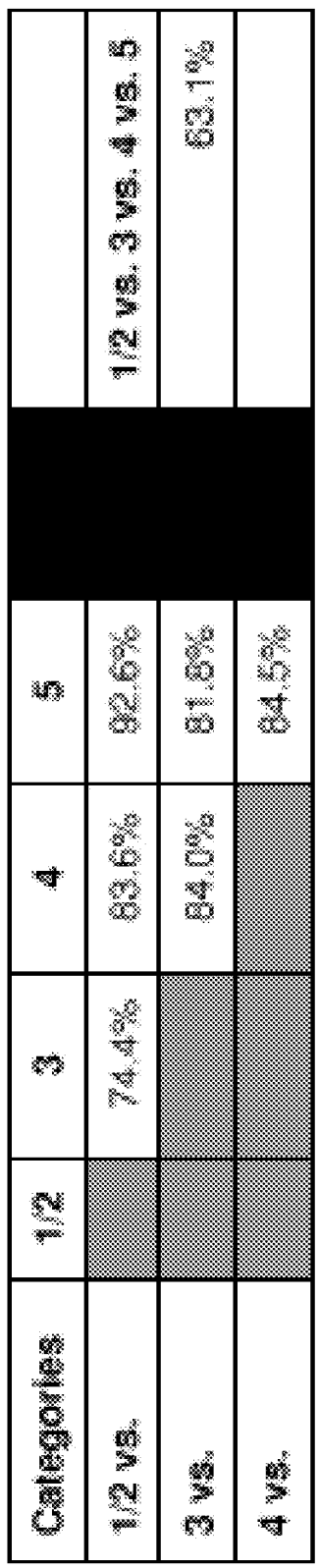
FIG. 17 shows a chart of the four-way mean optimal performance matrix when categories 1 and 2 are combined.

FIG. 17 shows the mean optimal performance matrix when we combine categories 1 and 2. These results reflect the use of a 45×45 window, all nine training sets, texture binary and outlier features, no border features and the radial basis function kernel. We find these results quite pleasing. All binary comparisons show a correct categorization rate above 74.0% with most higher than 80.0%.

Considering the specific setting that produces these results, we first notice that no border features are included. The inclusion of the texture binary and outlier features supports our hypothesis that both the percentage of healthy area and the level of homogeneity in the colony contribute to its overall characterization.

To examine further the effects of including the border features derived from our revised border criterion, we report the mean optimal results under two different conditions: required exclusion and required inclusion of the border features. FIG. 18 shows the resulting performance matrix, where, for each category comparison, the first percentage reflects border feature exclusion and the second number reflects inclusion. Category comparisons for which the use of border features either does not change or improves performance are shaded.

We notice that the border features—specifically the border binary features—improve performance in three of the seven category comparisons and have no effect in a fourth. Additionally, the mean performances of the two cases differ by only 0.7%. Thus, we cannot make any clear conclusions as to the effects of border inclusion, and in the case of mean optimality, we are indifferent between including and excluding the revised border criterion features.

Individual Optimality Results

Figure 19:
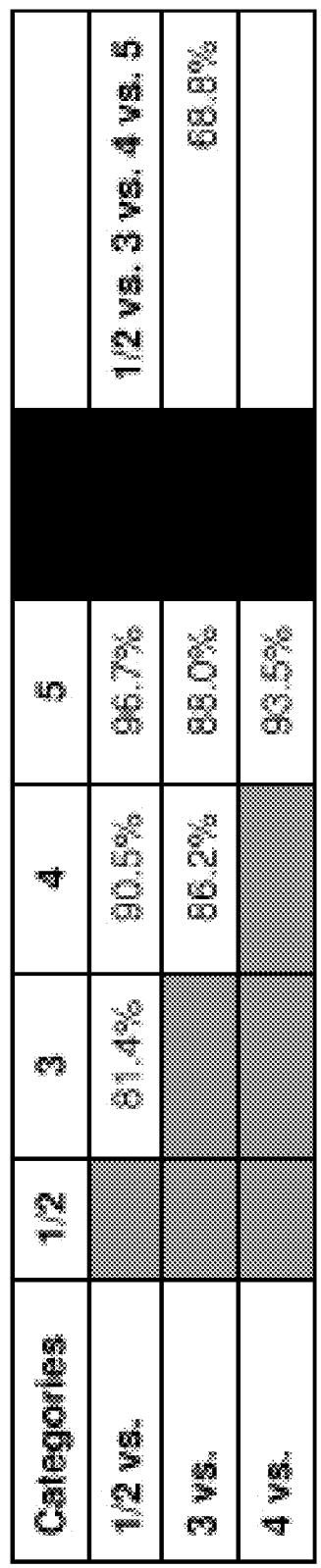
FIG. 19 shows a chart of the four-way individual optimal performance matrix.
Figure 23:
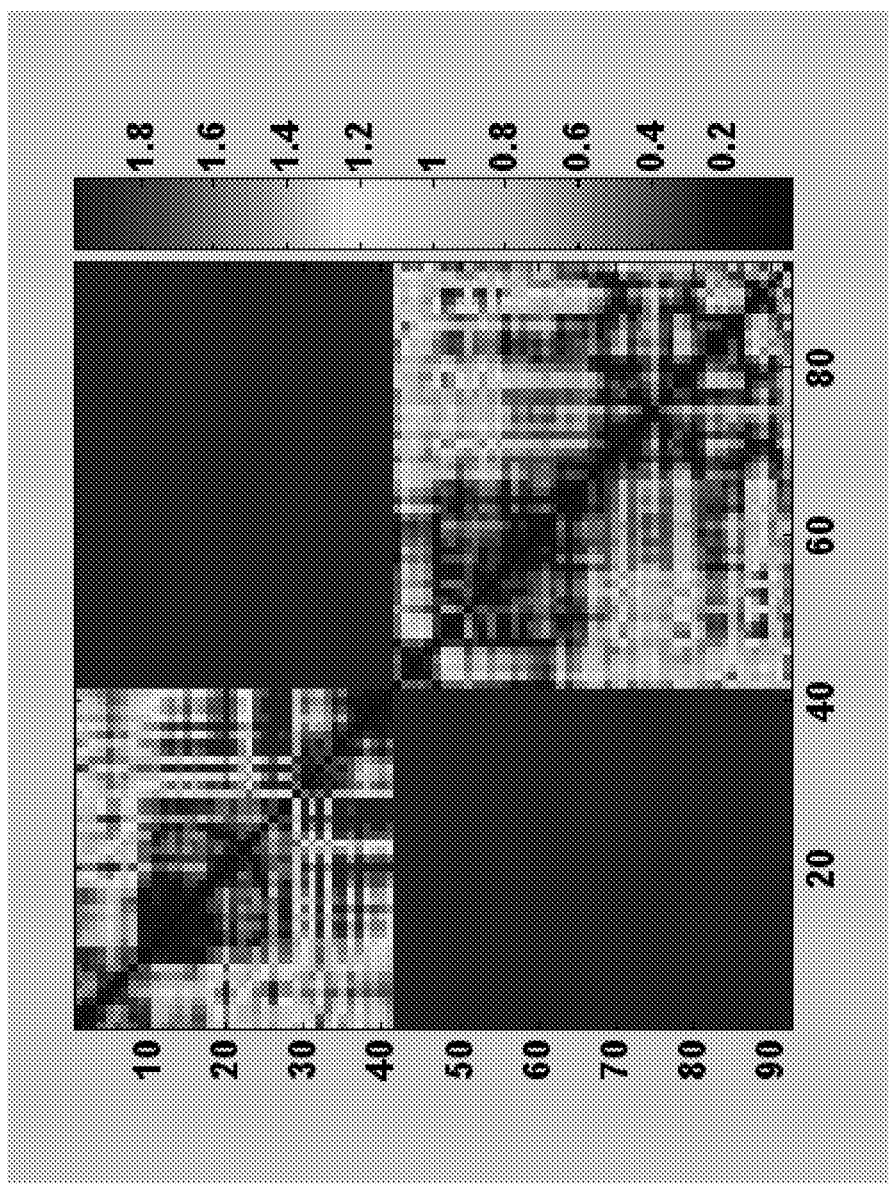
FIG. 23 shows a graph of that visually displays classification results. Cell types are plotted along the x-axis and y-axis. In this figure, 40 differentiated stem cells and 50 pluripotent stem cells are plotted along both the x-axis and y-axis. The intersection of two cell types in the graph is annotated by the statistical distance of the two cell types (e.g., Kullback-Leibler Distance between the density functions of wavelet coefficients). A color is assigned to the intersection based on the statistical distance, with increasing distance moving from blue to red. In the upper left corner of the graph, the 40×40 block of differentiated cells are seen to be closer to each other based on the color pattern. In the lower right corner of the graph, the 50×50 block that represents the pluripotent class are also close to each other. The off diagonal blocks, which represent the distance between a stem cell in one class and the stem cells in another class are all dark red, showing that stem cells from different classes are far apart.
Figure 24:
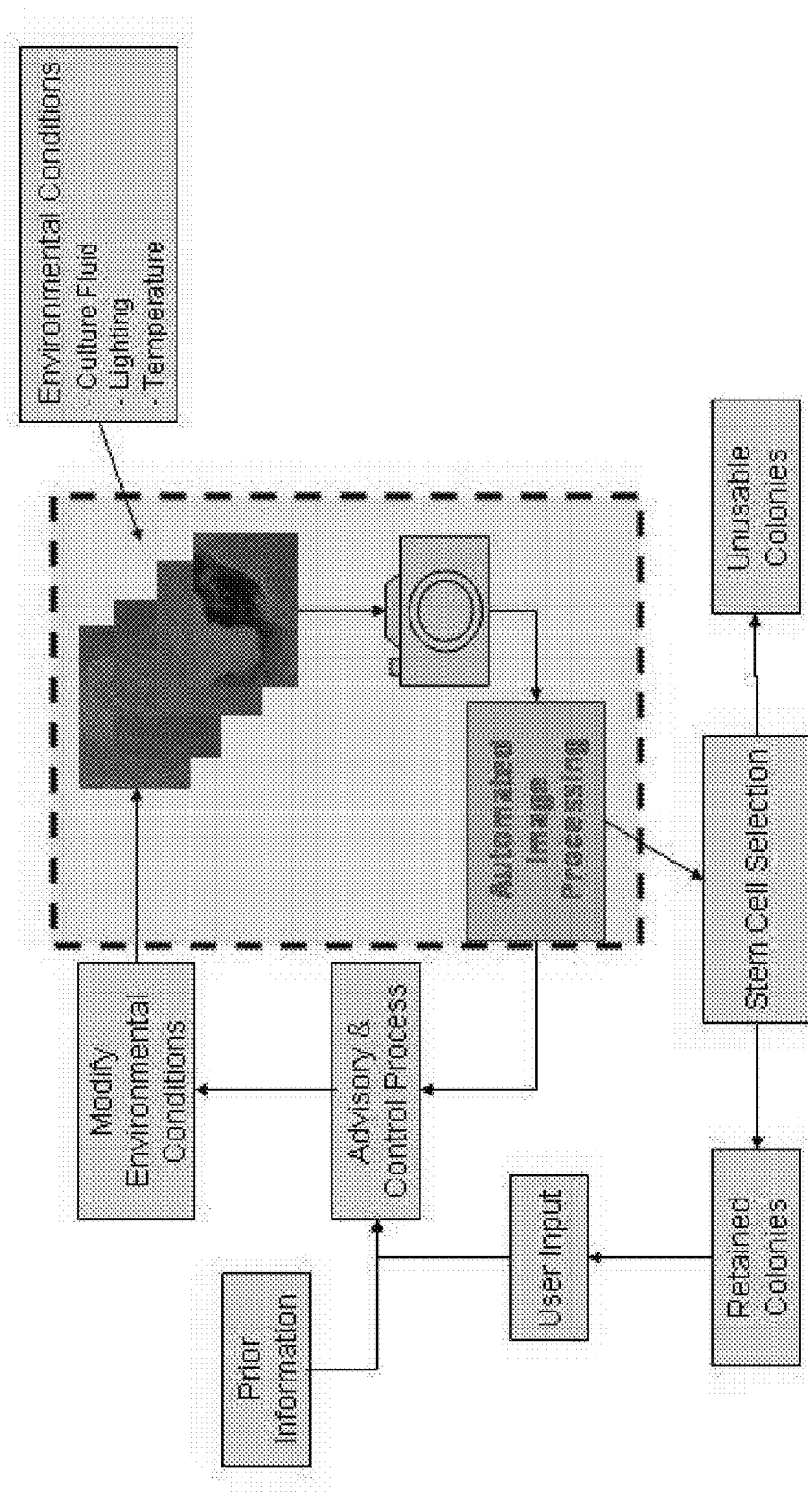
FIG. 24 shows a schematic of the architecture of a cellular structure classification system.

FIG. 19 shows the individual optimal performance matrix. We first note the high categorization rates across all the comparisons. We are especially successful in separating category 5 from the other categories, achieving no worse than 88.0% and up to 96.7% performance for all three comparisons. Note also that the 68.8% rate when comparing all four categories is excellent considering than we would expect only a 25.0% rate for a random classifier. We also observe that these individual optimal rates are consistently higher than the corresponding mean optimal rates in FIG. 17. This is to be expected since individual optimality chooses the best feature and parameter setting for each comparison, thus not imposing a common, and possibly worse, setting on all comparisons as with the mean optimal case.

In examining the feature and parameter settings that yield each individual optimal categorization rate, we observe that the border features are used in only one of the seven comparisons, namely the full four-way comparison. Additionally, the most common texture features include the texture binary and outlier features.

FIG. 20 compares border exclusion and inclusion for the individual optimal case. Overall, excluding the border features improves performance by only 1.0%, and while it produces higher rates in six of the seven comparisons, the performance increase in each is minimal. Thus, as with mean optimality, we are indifferent between including and excluding the border features.

On Separating Categories 1 and 2

In addition to the four-way results presented above where we employed a composite category consisting of the original categories 1 and 2, we also present results where we do not combine categories 1 and 2. The similarity of these two categories makes discriminating between them a difficult endeavor. We thus expect to see rather lower classification rates in the performance matrices when comparing categories 1 and 2.

The mean and individual optimal five-way performance matrices are shown in FIGS. 21 and 22, respectively. As above, these matrices show the categorization rates both excluding (first percentage) and including (second percentage) border features for each category comparison. Again, if the border features either increase or have no effect on the categorization rate for a specific comparison, the associated cell is shaded.

In examining these matrices, we first note that we do indeed have rather low categorization rates between categories 1 and 2. More encouragingly, though, we see that for both mean and individual optimality, the inclusion of the border features increases the ability of the classifier to distinguish between categories 1 and 2. These increases are not trivial; we observe a full 7.4% increase for mean optimality and 5.3% increase for individual optimality. In both cases, the border binary features are the significant contributors to this increase.

In addition to aiding the discrimination between categories 1 and 2, the inclusion of border features under mean optimality yields a 12% increase in comparing categories 1 and 4 and a full 16.7% increase in comparing categories 2 and 4. In comparison, the worst performance loss we suffer by including border features is only 6.0% in comparing categories 3 and 4. While we do not see as significant performance gains under individual optimality, we neither see significant degradation by including border features.

Implementation

Having demonstrated the effective categorization ability of our Tier 2 methodology, we discuss its practical implementation. We consider a stem cell researcher with a new collection of colony images that he wishes to categorize. He should first utilize the four category scenario and run the full four-way classification using its individual optimal setting:

Window Size of 45×45
Training Set 5 (tight texture+loose texture)
Border Binary Features
Texture Confidence and Outlier Features
Radial Basis Function Kernel for Tier 2 SVM Based on the results above, he would expect a 68.8% correct categorization of his colonies into the four different categories for this run.

For any colonies classified to the composite "1/2" category, he should run the pairwise comparison between categories 1 and 2 of the five category case using the individual optimal setting for that comparison:

Window Size of 45×45
Training Set 4 (tight texture+black texture)
Border Binary Features
Texture Outlier Features
Tier 2 Polynomial of Degree 2 for Tier 2 SVM He would expect to classify 63.7% of these colonies correctly into category 1 and category 2.

Based on these two runs, the researcher could expect to have a relatively good idea of the quality of each of his new colonies. If he wishes to make further pairwise comparison, he should employ the individual optimal settings for each of the desired comparisons.

Overall, based on the high categorization rates under both mean and individual optimality when categories 1 and 2 are combined, the Tier 2 approach that we have proposed represents a useful and successful methodology for performing quantitative stem cell colony categorization. For mean optimality, five of the six binary comparisons yield categorization rates above 80.0%. For individual optimality, all six binary rates exceed 80.0% with three beyond 90.0%. For the full four-way comparison using individual optimality, we are successful 68.8% of the time.

For the four category case, we observe two consistent colony-wise feature and SVM parameter trends. First, among the interior texture features, the binary and outlier features appear most significant. Secondly, the border features from the revised border criterion are generally not helpful in increasing categorization performance.

However, these border features do have a positive influence when we attempt to separate categories 1 and 2. Their inclusion increases our ability to separate categories 1 and 2 by 7.4% under mean optimality and 5.3% under individual optimality. They also yield performance increases by up to 16.7% for some binary category comparisons with only marginal losses in others.

The present invention provides among other things synthetic polynucleotide constructs and methods for producing synthetic polynucleotide constructs. While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

All publications and patents mentioned herein, including those items listed below, are hereby incorporated by reference in their entirety as if each individual publication or patent was specifically and individually indicated to be incorporated by reference. In case of conflict, the present application, including any definitions herein, will control.

Also incorporated by reference in their entirety are any polynucleotide and polypeptide sequences which reference an accession number correlating to an entry in a public database, such as those maintained by The Institute for Genomic Research (TIGR) (www.tigr.org) and/or the National Center for Biotechnology Information (NCBI) (www.ncbi.nlm.nih.gov).

We claim:

1. A non-invasive system for determining one or more characteristics of a cell, comprising:
   a) a first computer processor for deriving a plurality of numerical image features from an image of said cell at the pixel level and at the cellular structure level using a tiered hierarchical cellular structure paradigm stored in memory, and
   b) a second computer processor for classifying a cellular structure according to a statistical classification model based on image features derived at the pixel level and at the cellular structure level.

2. The system of claim 1, wherein the first computer processor and the second computer processor are the same processor.

3. The system of claim 1, wherein the first processor has at least one analysis module for deriving image features from an image of a stem cell and at least one module for determining stemness or plasticity of the stem cell based on the image features.

4. The system of claim 1, wherein at least one of the first and second computer processors is configured to determine characteristics of a cell comprising one or more of: the viability of the cell, the stemness or plasticity of the cell, the suitability for implantation of the cell and the suitability for fertilization of the cell.

5. The system of claim 1, wherein at least one of the characteristics the processor is configured to determine comprises suitability for fertilization of the cell.

6. The system of claim 1, wherein at least one of the first and second computer processors is configured to determine characteristics of at least one eukaryotic cell.

7. The system of claim 1, wherein at least one of the first and second computer processors is configured to determine characteristics of at least one of an egg cell, an embryo, a stem cell, a tumor cell, a differentiated cell, a colon cell, a breast cell, a lung cell, a prostate cell, a pancreatic cell, a kidney cell, an endometrial cell, a cervical cell, an ovarian cell, and a thyroid cell.

8. The system of claim 1, wherein the second processor has at least one analysis module for classifying a cellular structure selected from at least one of a cell colony, a nucleus, cell membrane, cell wall, mitochondria, golgi, chromatin, DNA, cytoskeleton, ribosome, and endoplasmic reticulum.

9. The system of claim 1, wherein the first processor has at least one analysis module for deriving numerical image features from at least one physiological feature of the imaged cells.

10. The system of claim 9, wherein said at least one physiological feature includes at least one of a cellular border, a colony border, a cell membrane, cell texture, and colony texture.

11. The system of claim 1, wherein the first processor has capacity to derive the plurality of image features from images of cells obtained at different times during one or more time intervals.

12. The system of claim 1, wherein the statistical classification model analyzes at least one change in the image features over the one or more time intervals and identifies at least one change in the characteristics of the cell over an interval of time.

13. The system of claim 1, wherein the statistical classification model takes into account external cellular structure data and data from the derived image features.

14. The system of claim 1, wherein at least one of the first and second computer processors is configured to derive said image features by at least one of wavelet decomposition, multiresolution analysis, time-space frequency analysis, dilate and erode, co-occurrence matrices, Fourier spectral analysis, Gabor methods, wavelet packet decomposition, statistical analysis of wavelet coefficients, Markov Random fields, autoregression models, spatial domain filters, Fourier and Wavelet domain filters, and texture segmentation.

15. The system of claim 1, wherein at least one of the first and second computer processors is configured to derive said image features in a multi-tiered hierarchical cellular structure paradigm by:

a) deriving a plurality of image features at the pixel level in tier 1;
b) deriving a plurality of image features in increasing image resolutions in progressive tiers; and
c) deriving a plurality of image features at the cellular structure level in the final tier.

16. The system of claim 1, wherein at least one of the first and second computer processors is configured to derive said image features in a two-tiered hierarchical cellular structure paradigm, wherein a plurality of image features is derived at the pixel level in the first tier, and wherein a plurality of image features is derived at the cellular structure level in the second tier.

17. The system of claim 1, wherein the statistical classification model is based on a non-parametric class algorithm.

18. The system of claim 1, wherein the statistical classification model is based on a parametric class algorithm.

19. The system of claim 1, wherein said statistical classification model is based on the application of at least one of a Bayes classification scheme, discriminant analysis, Parzen window analysis, multiple hypothesis testing, neural network analysis, k-nearest neighbor calculation, decision tree processing, hierarchical clustering, fuzzy method analysis, component analysis, support vector machines analysis, and Kullback Leibler Distances analysis.

20. A computer readable medium storing computer executable instructions, which, when executed by a processor, cause the processor to carry out a method of determining one or more characteristics of a cell, the method comprising:
a) deriving a plurality of numerical image features from an image of said cell at the pixel level using a tiered hierarchical cellular structure paradigm stored in memory, and at the cellular structure level, and
b) classifying a cellular structure according to a statistical classification model based on image features derived at the pixel level and at the cellular structure level.

* * * * *